United States Patent
Kim et al.

(10) Patent No.: US 11,297,586 B2
(45) Date of Patent: Apr. 5, 2022

(54) METHOD FOR TRANSMITTING/RECEIVING SIGNAL IN WIRELESS COMMUNICATION SYSTEM AND DEVICE SUPPORTING SAME

(71) Applicant: LG ELECTRONICS INC., Seoul (KR)

(72) Inventors: Youngtae Kim, Seoul (KR); Hyangsun You, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/049,946

(22) PCT Filed: May 17, 2019

(86) PCT No.: PCT/KR2019/005930
§ 371 (c)(1),
(2) Date: Oct. 22, 2020

(87) PCT Pub. No.: WO2019/221547
PCT Pub. Date: Nov. 21, 2019

(65) Prior Publication Data
US 2021/0243708 A1      Aug. 5, 2021

Related U.S. Application Data

(60) Provisional application No. 62/673,146, filed on May 18, 2018.

(51) Int. Cl.
*H04W 56/00* (2009.01)
*H04W 4/40* (2018.01)
*H04W 72/14* (2009.01)

(52) U.S. Cl.
CPC .......... *H04W 56/005* (2013.01); *H04W 4/40* (2018.02); *H04W 56/001* (2013.01); *H04W 72/14* (2013.01)

(58) Field of Classification Search
None
See application file for complete search history.

(56) References Cited

U.S. PATENT DOCUMENTS

2018/0092139 A1    3/2018   Novlan et al.
2018/0139787 A1    5/2018   Islam et al.
(Continued)

OTHER PUBLICATIONS

PCT International Application No. PCT/KR2019/005930, International Search Report dated Sep. 17, 2019, 15 pages.
(Continued)

*Primary Examiner* — Jutai Kao
(74) *Attorney, Agent, or Firm* — Lee Hong Degerman Kang Waimey

(57) ABSTRACT

The present invention relates to a wireless communication system, and specifically, provides a communication method and a device therefor, the communication method comprising: transmitting, to a terminal, an uplink grant comprising first information for changing a timing advance (TA) value; receiving, from the terminal, a first uplink signal which is based on the first information; and receiving a first downlink signal from a base station, wherein the transmission timing of the first uplink signal from the terminal is determined on the basis of the first information so that the first uplink signal and the first downlink signal may be received simultaneously at a relay node.

8 Claims, 18 Drawing Sheets

(a)

(b)

(56) References Cited

U.S. PATENT DOCUMENTS

| | | | | |
|---|---|---|---|---|
| 2019/0132783 | A1* | 5/2019 | Deng | H04W 36/0077 |
| 2019/0349036 | A1* | 11/2019 | Wang | H04B 7/14 |
| 2020/0163097 | A1* | 5/2020 | Qin | H04W 84/047 |
| 2020/0374871 | A1* | 11/2020 | Liu | H04W 56/0015 |
| 2021/0058874 | A1* | 2/2021 | Pan | H04W 56/0015 |
| 2021/0176670 | A1* | 6/2021 | Keskitalo | H04W 24/08 |
| 2021/0185727 | A1* | 6/2021 | Ansari | H04W 74/0808 |

OTHER PUBLICATIONS

AT&T, "Overview of physical layer enhancements for IAB," 3GPP TSG RAN WG1 Meeting #93, R1-1806970, Busan, Korea, May 2018, 12 pages.

Nokia et al., "IAB Synchronization," 3GPP TSG RAN WG1 Meeting #93, R1-1806664, Busan, Korea, May 2018, 7 pages.

CATT, "NR Physical Layer design for IAB backhaul link," 3GPP TSG RAN WG1 Meeting #93, R1-1806321, Busan, Korea, May 2018, 7 pages.

* cited by examiner (A) CONTROL-PLANE PROTOCOL STACK (B) USER-PLANE PROTOCOL STACK

METHOD FOR TRANSMITTING/RECEIVING SIGNAL IN WIRELESS COMMUNICATION SYSTEM AND DEVICE SUPPORTING SAME

CROSS-REFERENCE TO RELATED APPLICATIONS

This application is the National Stage filing under 35 U.S.C. 371 of International Application No. PCT/KR2019/005930, filed on May 17, 2019, which claims the benefit of U.S. Provisional Application No. 62/673,146, filed on May 18, 2018, the contents of which are all hereby incorporated by reference herein in their entirety.

TECHNICAL FIELD

The present disclosure relates to a method and apparatus used in a wireless communication system, and more particularly, to a method and apparatus for transmitting and receiving a signal in the next-generation communication system.

BACKGROUND ART

The necessity for mobile broadband communication more improved than the conventional radio access technology (RAT) has increased as a number of communication devices has required higher communication capacity. In addition, massive machine type communications (MTC) capable of providing various services anytime and anywhere by connecting a number of devices or things to each other has been considered as a main issue in the next generation communications. Moreover, a communication system design capable of supporting services sensitive to reliability and latency has been discussed. The introduction of next-generation RAT considering enhanced mobile broadband communication (eMBB), massive MTC (mMTC), ultra-reliable and low-latency communication (URLLC), etc. has been discussed. In the present disclosure, the corresponding technology is referred to as new radio access technology (NR), for convenience of description.

DISCLOSURE

Technical Problem

An object of the present disclosure is to provide a method and apparatus for transmitting and receiving a signal in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method and apparatus for transmitting and receiving a signal in a wireless communication system.

In one aspect of the present disclosure, a communication method by a relay node in a wireless communication system is provided. The method may include: transmitting an uplink grant including first information for changing a timing advance (TA) value to a user equipment (UE); receiving a first uplink signal based on the first information from the UE; and receiving a first downlink signal from a base station (BS). A transmission timing of the first uplink signal from the UE may be determined based on the first information such that the relay node simultaneously receives the first uplink signal and the first downlink signal.

In another aspect of the present disclosure, a relay node used in a wireless communication system is provided. The relay node may include: a memory; and a processor. The processor may be configured to: transmit an uplink grant including first information for changing a TA value to a UE; receive a first uplink signal based on the first information from the UE; and receive a first downlink signal from a BS. A transmission timing of the first uplink signal from the UE may be determined based on the first information such that the relay node simultaneously receives the first uplink signal and the first downlink signal.

The method may further include: transmitting downlink assignment information including second information for changing a propagation delay value to the UE; transmitting a second downlink signal based on the second information to the UE; and transmitting a second uplink signal to the BS. A transmission timing of the second downlink signal may be determined based on the second information such that the relay node simultaneously transmits the second uplink signal and the second downlink signal.

When the first downlink signal includes a synchronization signal block (SSB), the first uplink signal may be dropped.

When the second downlink signal includes an SSB, the second uplink signal may be dropped.

Further, the UE may include an autonomous driving vehicle.

The above aspects of the present disclosure are merely a part of preferred embodiments of the present disclosure. Various embodiments reflecting the technical features of the present disclosure could be derived and understood based on the following detailed description of the present disclosure by those skilled in the art.

Advantageous Effects

According to the present disclosure, a timing advance (TA) value may be efficiently determined in next generation communication systems.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the invention, illustrate embodiments of the present disclosure and together with the description serve to explain the principle of the present disclosure. The technical features of the present disclosure are not limited to specific drawings and the features shown in the drawings are combined to construct a new embodiment. Reference numerals of the drawings mean structural elements.

BEST MODE

Figure 1:
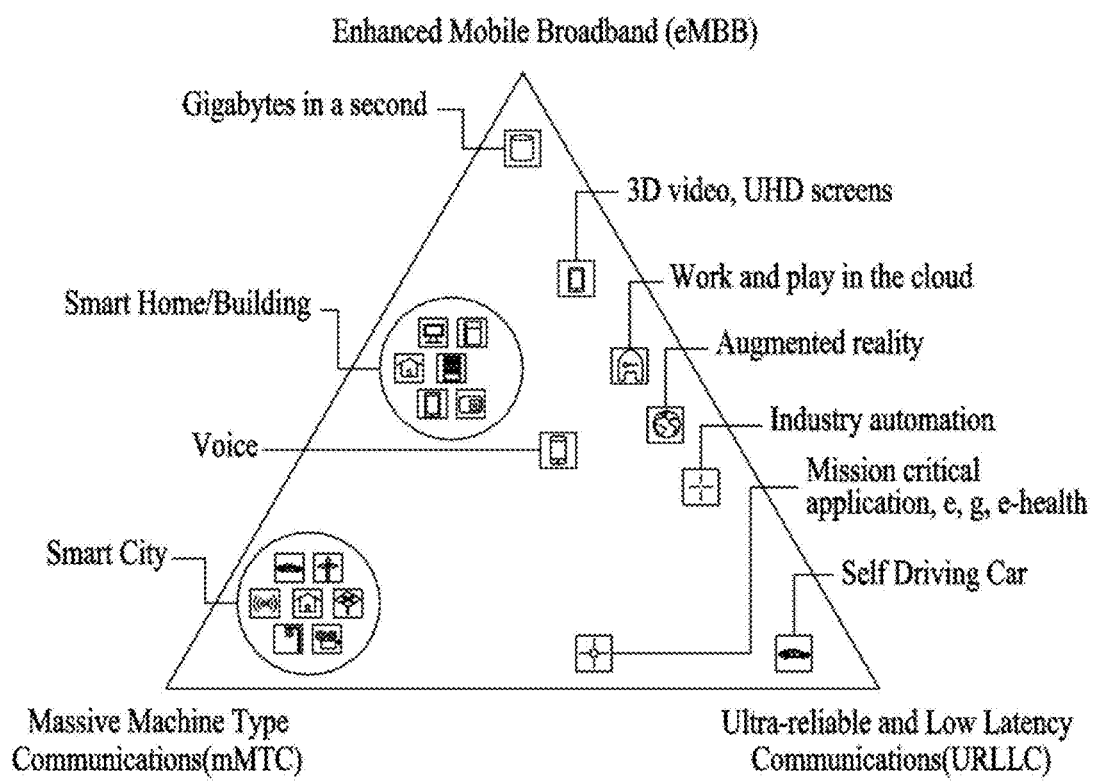
FIG. 1 is a diagram illustrating 5G use scenarios.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In describing the present disclosure, if the description of a procedure or step is determined to obscure the subject matter of the present disclosure, the procedure or step will not be described. In addition, a procedure or step that could be understood to those skilled in the art will not be described.

In the entire specification, when it is said that a certain portion "comprises or includes" a certain component, it may be interpreted to mean that other components are not excluded but may be further included unless specified otherwise. The terms "unit", "-or/er" and "module" described in the specification may mean a unit for processing at least one function or operation, which may be implemented by hardware, software or a combination thereof. The words "a or an", "one", "the" and words related thereto may be used to include both a singular expression and a plural expression unless the context of the present disclosure (particularly, the context of the following claims) clearly indicates otherwise.

In the embodiments of the present disclosure, a description is made, centering on a data transmission and reception relationship between a base station (BS) and a mobile station (MS). The BS is a terminal node of a network, which communicates directly with an MS. In some cases, a specific operation described as performed by the BS may be performed by an upper node of the BS.

That is, in the network including a plurality of network nodes including the BS, various operations performed for communication with the MS may be performed by the BS or network nodes other than the BS. In the present disclosure, the term BS may be replaced with the term fixed station, Node B, evolved Node B (eNode B or eNB), gNode B (gNB), advanced base station (ABS), or access point. Further, the term BS may cover remote radio head (RRH), eNB, transmission point (TP), reception point (RP), and relay in its broad sense.

In the embodiments of the present disclosure, the term terminal may be replaced with the term user equipment (UE), MS, subscriber station (SS), mobile subscriber station (MSS), mobile terminal, or advanced mobile station (AMS).

A transmitter refers to a fixed node and/or a mobile node which provides data service or voice service, and a receiver refers to a fixed node and/or a mobile node which receives data service or voice service. On uplink (UL), therefore, an MS may serve as a transmitter and a BS may serve as a receiver, whereas on downlink (DL), the MS may serve as a receiver and the BS may server as a transmitter.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that may be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, the 3GPP NR system as well as the 3GPP LTE/LTE-A systems will be described as examples of wireless access systems to which the embodiments of the present disclosure are applicable.

Techniques described herein may be used in various wireless access systems such as code division multiple access (CDMA), frequency division multiple access (FDMA), time division multiple access (TDMA), orthogonal frequency division multiple access (OFDMA), and single carrier-frequency division multiple access (SC-FDMA).

CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, and evolved-UTRA (E-UTRA).

UTRA is a part of universal mobile telecommunications system (UMTS). 3rd generation partnership project (3GPP) LTE is a part of Evolved UMTS (E-UMTS) using E-UTRA. 3GPP LTE employs OFDMA for DL and SC-FDMA for UL. LTE-A/LTE-A pro is an evolution of 3GPP LTE. 3GPP new radio or new radio access technology (NR) is an evolution of 3GPP LTE/LTE-A/LTE-A pro.

While embodiments of the present disclosure are described in the context of 3GPP communication systems (e.g., LTE and NR) for clarity, they are purely exemplary. The LTE refers to technologies beyond 3GPP technical specification (TS) 36.xxx Release 8. In particular, LTE technologies beyond 3GPP TS 36.xxx Release 10 are referred to as the LTE-A, and LTE technologies beyond 3GPP TS 36.xxx Release 13 are referred to as the LTE-A pro. The 3GPP NR refers to technologies beyond 3GPP TS 38.xxx Release 15. The LTE/NR may be called '3GPP system'. Herein, "xxx" refers to a standard specification number. The LTE/NR may be commonly referred to as '3GPP system'. Details of the background, terminology, abbreviations, etc. used herein may be found in documents published before the present disclosure. For example, the present disclosure may be supported by the following documents: 3GPP TS 36.211, 3GPP TS 36.212, 3GPP TS 36.213, 3GPP TS 36.300, 3GPP TS 36.321, 3GPP TS 36.331, 3GPP TS 37.213, 3GPP TS 38.211, 3GPP TS 38.212, 3GPP TS 38.213, 3GPP TS 38.214, 3GPP 38.300, 3GPP TS 38.321, and 3GPP TS 38.331. That is, the steps or parts, which are not explained to clearly reveal the technical idea of the present disclosure, in the embodiments of the present disclosure may be supported by the above documents.

While the embodiments of the present disclosure are described based on the 3GPP LTE/LTE-A systems and 3GPP NR system in order to clarify the technical features of the present disclosure, the present disclosure is also applicable to an IEEE 802.16e/m system, etc.

The 3GPP communication standards define DL physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNB and a UE. For example, cell specific RS, UE-specific RS (UE-RS), positioning RS (PRS), and channel state information RS (CSI-RS) are defined as DL RSs. The 3GPP LTE/LTE-A standards define UL physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and demodulation reference signal (DMRS) for a UL control/data signal, and sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, when it is said that a UE transmits a PUCCH/PUSCH/PRACH, this means that UCI/UL data/a random access signal is transmitted on or through the PUCCH/PUSCH/PRACH. Further, when it is said that a BS transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

Referring to FIG. 1, three major areas required for 5G includes: (1) enhanced mobile broadband (eMBB); (2) massive machine-type communications (mMTC); and (3) ultra-reliable and low-latency communications (URLLC). Some use cases may require a plurality of areas for optimization, and other use cases may focus on only one key performance indicator (KPI). 5G supports these various use cases in a flexible and reliable manner.

The eMBB further surpasses basic mobile Internet access and covers abundant interactive operations, clouds, or media and entertainment applications in augmented reality. Data is a key driver in 5G, and dedicated voice services may not be provided for the first time in the 5G era. In 5G, voice is expected to be processed as an application simply based on a data connection provided by communication systems. Main reasons for an increase in the amount of traffic are an increase in the size of content and an increase in the number of applications that require high data rates. Streaming services (audio and video) and interactive video and mobile Internet connectivity will be widely used as more devices are connected to the Internet. A large number of applications require always-on connectivity to push real-time information and notifications to users.

Cloud storage and applications are rapidly growing in use on mobile communication platforms and applicable to both work and entertainment. The cloud storage is a special use case which contributes to improvement of uplink data rates. 5G is also used for remote business on the cloud and requires much lower end-to-end latency to maintain a satisfactory user experience when a tactile interface is used. In entertainment, for example, cloud games and video streaming are other key factors that require enhanced mobile broadband capabilities. Entertainment is essential for smartphones and tablet PCs in any places with high mobility such as a train, a car, and an airplane. Another use case is augmented reality and information retrieval for entertainment. Here, the augmented reality requires significantly low latency and a large amount of instantaneous data.

One of the most widely used 5G applications is the mMTC which connects embedded sensors in any fields. Potentially, the number of IoT devices is expected to reach 20.4 billion by 2020. Industrial IoT is one field where 5G plays a key role in enabling smart cities, asset tracking, smart utilities, and agricultural and security infrastructures.

The URLLC includes new services that will change the industry through remote control of key infrastructures and ultra-reliable/low-latency links such as self-driving vehicles. Reliability and latency levels are essential for smart grid control, industrial automation, robotics, and drone control and coordination.

Hereinafter, a plurality of use cases included in the triangle of FIG. 1 will be described in detail.

5G is a technique for providing a stream rated at hundreds of megabits per second to gigabytes per second and may complement fiber-to-the-home (FTTH) and cable-based broadband (or DOCSIS). Such a high speed may be required to provide not only virtual reality (VR) and augmented reality (AR) but also television (TV) services with a resolution of 4K or higher (6K, 8K, or higher). VR and AR applications mostly include immersive sporting events. A specific application may require a special network configuration. For example, for a VR game, a game company may need to integrate a core server with an edge network server of a network operator in order to minimize latency.

The automotive sector is expected to be an important new driver for 5G with many use cases for vehicle mobile communication. For example, entertainment for passengers requires high-capacity and high-mobility broadband at the same time because future users expect to continue high quality of connections independently of their locations and speeds. Another use case in the automotive field is an AR dashboard. The AR dashboard identifies an object in the dark and tells a driver about the distance and movement of the object, that is, displays overlay information on top of what the driver is seeing through the front window. In the future, wireless modules enable communication between vehicles, information exchange between vehicles and supporting infrastructures, and information exchange between vehicles and other connected devices (e.g., device accompanied by pedestrians). A safety system guides alternative driving courses so that drivers may drive safely to reduce the risk of accidents. The next step would be a remote control vehicle or a self-driving vehicle, which requires highly reliable and very fast communication between different self-driving vehicles and between vehicles and infrastructures. In the future, the self-driving vehicle will perform all driving activities, and the driver will focus only on traffic problems that the vehicle cannot autonomously identify. Technical requirements of the self-driving vehicle are ultra-low latency, ultra-high speed, and high reliability to increase traffic safety to levels that humans cannot achieve.

In a smart city and a smart home, which is called a smart society, a high-density wireless sensor network will be embedded. A distributed network of intelligent sensors will identify conditions for cost and energy-efficient maintenance of a city or house. Similar settings may be established for each home. Temperature sensors, window and heating controllers, security systems, and home appliances are all wirelessly connected. Although many of these sensors have typically low data rates, low power, and low cost, real-time high-definition video may be required in a particular type of device for monitoring.

Since consumption and distribution of energy including heat or gas is highly decentralized, automatic control of a distributed sensor network is required. A smart grid collects information and interconnects sensors using digital information and communication technology to operate the sensors based on the collected information. Such information may include supplier and consumer behavior, thus enabling the smart grid to improve the distribution of fuel such as electricity, in efficient, reliable, economical, production-sustainable, and automatic manners. The smart grid may be considered as a sensor network with low latency.

The health sector has a large number of applications that may benefit from mobile communication. Communication systems may support telemedicine, that is, provide medical care in remote areas. Telemedicine may help to reduce a distance barrier and improve access to medical services that are not continuously available in distant rural areas. Telemedicine is also used to save lives in critical treatment and emergency situations. A wireless sensor network based on mobile communication may provide remote monitoring and sensors for parameters, such as heart rate and blood pressure.

Wireless and mobile communication gradually becomes important in industrial applications. Wiring involves high costs for installation and maintenance. Thus, the possibility of replacement a cable by a reconfigurable wireless link is attractive for many industrial fields. However, to this end, a wireless connection needs to operate with similar latency, reliability, and capacity to those of a cable. In addition, the maintenance thereof also needs to be simplified. Low latency and low error probabilities are new requirements for 5G connections.

Logistics and freight tracking are important use cases for mobile communication that enables the tracking of inventory and packages wherever they are through using location based information systems. The logistics and freight use cases typically require lower data rates but need wide coverage and reliable location information.

Figure 2:
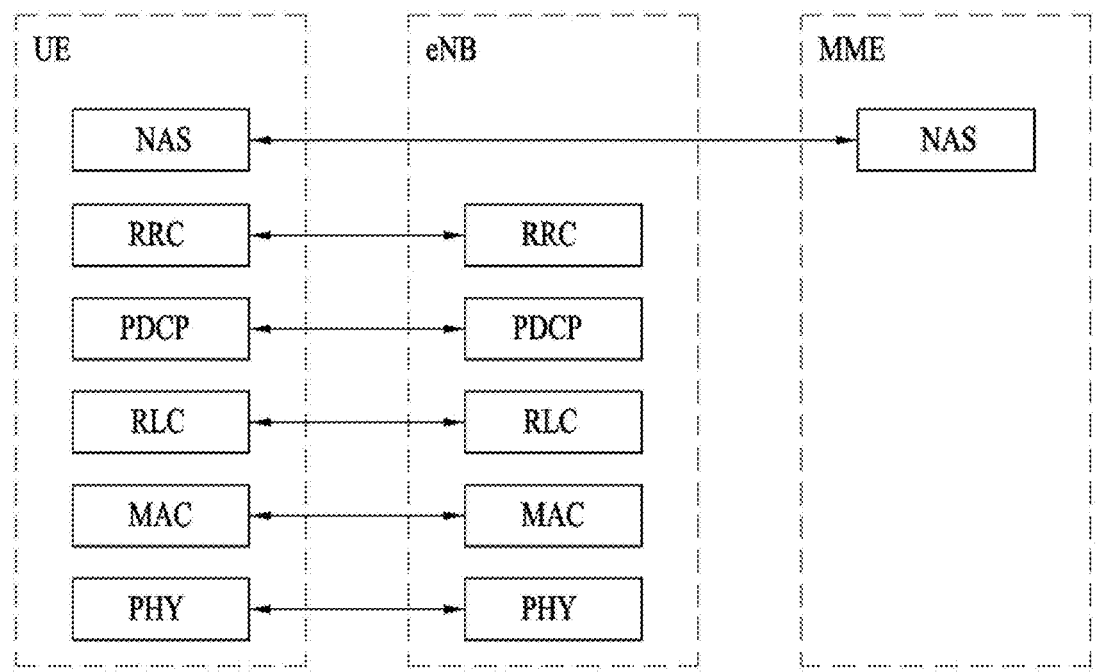
FIG. 2 is a diagram illustrating the architecture of control-plane and user-plane radio interface protocols between a user equipment (UE) and an evolved UMTS terrestrial radio access network (E-UTRAN) based on a $3^{rd}$ generation partnership project (3GPP) radio access network standard.
Figure 2:
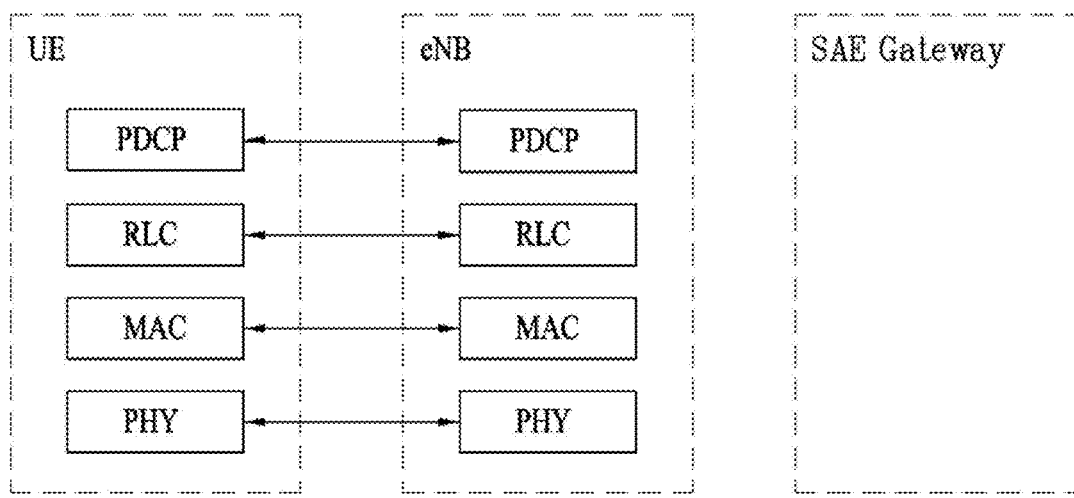

FIG. 2 is a diagram illustrating the architecture of control-plane and user-plane radio interface protocols between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

Layer 1 (i.e. L1) of the 3GPP LTE/LTE-A system is corresponding to a physical layer. A physical (PHY) layer of a first layer (Layer 1 or L1) provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an OFDMA scheme in DL and is modulated using a SC-FDMA scheme in UL.

Layer 2 (i.e. L2) of the 3GPP LTE/LTE-A system is split into the following sublayers: medium access control (MAC), radio link control (RLC), and packet data convergence protocol (PDCP). The MAC layer of a second layer (Layer 2 or L2) provides a service to an RLC layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

Layer 3 (i.e. L3) of the LTE/LTE-A system includes the following sublayers: radio resource control (RRC) and non-access stratum (NAS). An RRC layer located at the bottom of a third layer is defined only in the control plane. The RRC layer controls logical channels, transport channels, and physical channels in relation to configuration, re-configuration, and release of radio bearers. A radio bearer refers to a service that the second layer provides for data transmission between the UE and the E-UTRAN. To this end, the RRC layer of the UE and the RRC layer of the E-UTRAN exchange RRC messages with each other. The non-access stratum (NAS) layer positioned over the RRC layer performs functions such as session management and mobility management.

DL transport channels for transmission of data from the E-UTRAN to the UE include a broadcast channel (BCH) for transmission of system information, a paging channel (PCH) for transmission of paging messages, and a DL shared channel (SCH) for transmission of user traffic or control messages. Traffic or control messages of a DL multicast or broadcast service may be transmitted through the DL SCH and may also be transmitted through a separate DL multicast channel (MCH). Uplink transport channels for transmission of data from the UE to the network include a random access channel (RACH) for transmission of initial control messages and an UL SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 3:
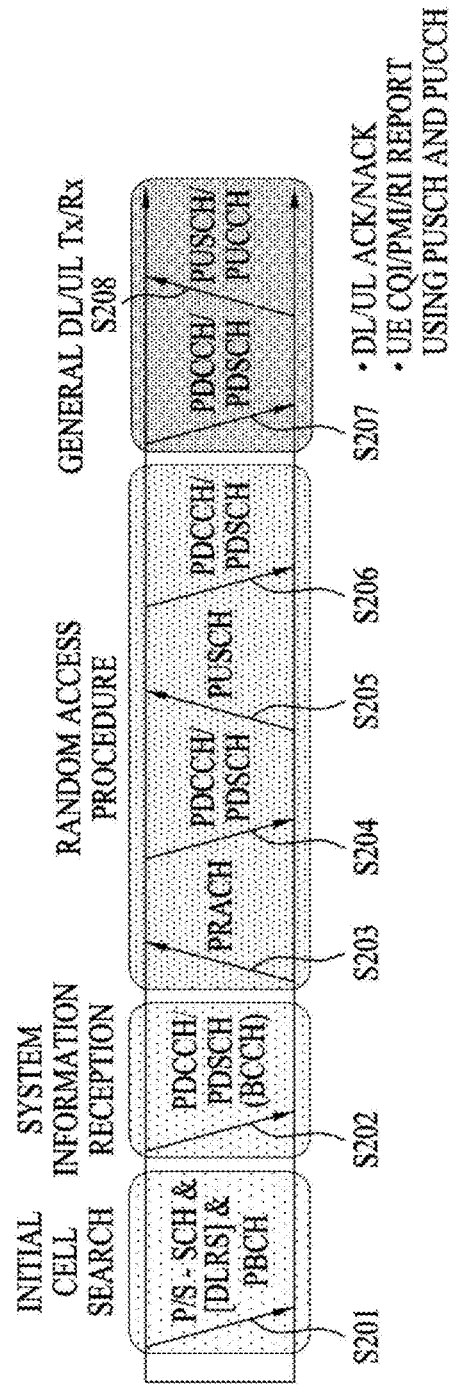
FIG. 3 is a diagram illustrating physical channels and a signal transmission method using the physical channels.

FIG. 3 illustrates physical channels and a general signal transmission method using the physical channels in a 3GPP system.

In a wireless communication system, a UE receives information from a BS on DL and transmits information to the BS on UL. Information transmitted and received between the BS and the UE includes data and various types of control information, and there are various physical channels according to the types/usages of the transmitted and received information.

When a UE is powered on or enters a new cell, the UE performs initial cell search including acquisition of synchronization with a BS (S11). For the initial cell search, the UE may receive a PSS, an SSS, and a PBCH in a synchronization signal block (SSB) from the BS. The UE acquires synchronization with the BS and information such as a cell identity (ID) by receiving the PSS and the SSS. Further, the UE may acquire broadcast information within a cell by receiving the PBCH from the BS. Further, the UE may check a DL channel state by receiving a DL RS during the initial cell search.

After the initial cell search, the UE may acquire more detailed system information by receiving a PDCCH and receiving on a PDSCH corresponding to the PDCCH (S12).

Subsequently, to complete the connection to the BS, the UE may perform a random access procedure with the BS (S13 to S16). In the random access procedure, the UE may transmit a preamble on a PRACH (S13) and receive a PDCCH and a random access response (RAR) for the preamble on a PDSCH corresponding to the PDCCH (S14). The UE may then transmit a PUSCH based on scheduling information included in the RAR (S15), and perform a contention resolution procedure including reception of a PDCCH and a PDSCH corresponding to the PDCCH (S16).

After the above procedure, the UE may receive a PDCCH and/or a PDSCH from the BS (S17) and transmit a PUSCH and/or a PUCCH to the BS (S18), in a general UL/DL signal transmission procedure. Control information that the UE transmits to the BS is generically called UCI. The UCI includes a hybrid automatic repeat and request acknowledgement/negative acknowledgement (HARQ-ACK/NACK), a scheduling request (SR), and channel state information (CSI). The CSI includes a channel quality indicator (CQI), a precoding matrix index (PMI), a rank indicator (RI), and so on. In general, UCI is transmitted on a PUCCH. However, when control information and traffic data should be transmitted simultaneously, the control information and traffic data may be transmitted on a PUSCH. In addition, the UE may transmit the UCI aperiodically on the PUSCH, upon receipt of a request/command from a network.

Figure 4:
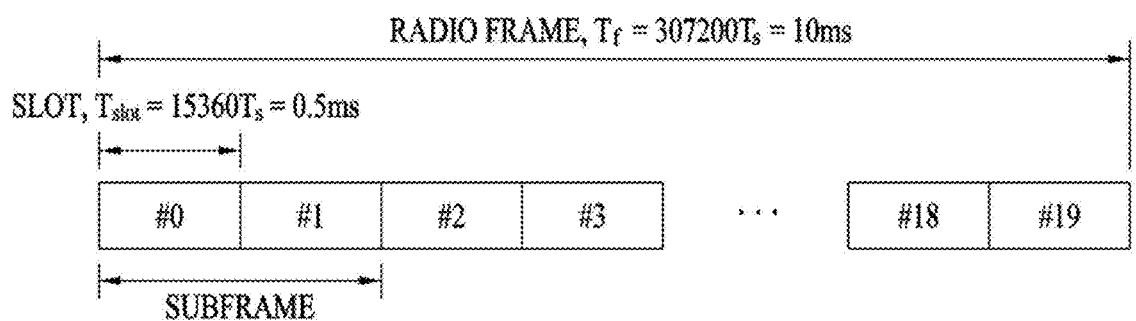
FIG. 4 is a diagram illustrating radio frame structures in a long term evolution (LTE) system.

FIG. 4 is a diagram illustrating exemplary radio frame structures in an LTE system.

Referring to FIG. 4, a radio frame is 10 ms (327200×$T_s$) long and divided into 10 equal-sized subframes. Each subframe is 1 ms long and further divided into two slots. Each slot is 0.5 ms (15360×$T_s$) long. Herein, $T_s$ represents a sampling time and $T_s=1/(15 \text{ kHz}\times 2048)=3.2552\times 10^{-8}$ (about 33 ns). A slot includes a plurality of OFDM symbols or SC-FDMA symbols in the time domain by a plurality of resource blocks (RBs) in the frequency domain. In the LTE system, one RB includes 12 subcarriers by 7 (or 6) OFDM symbols. A unit time during which data is transmitted is defined as a transmission time interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
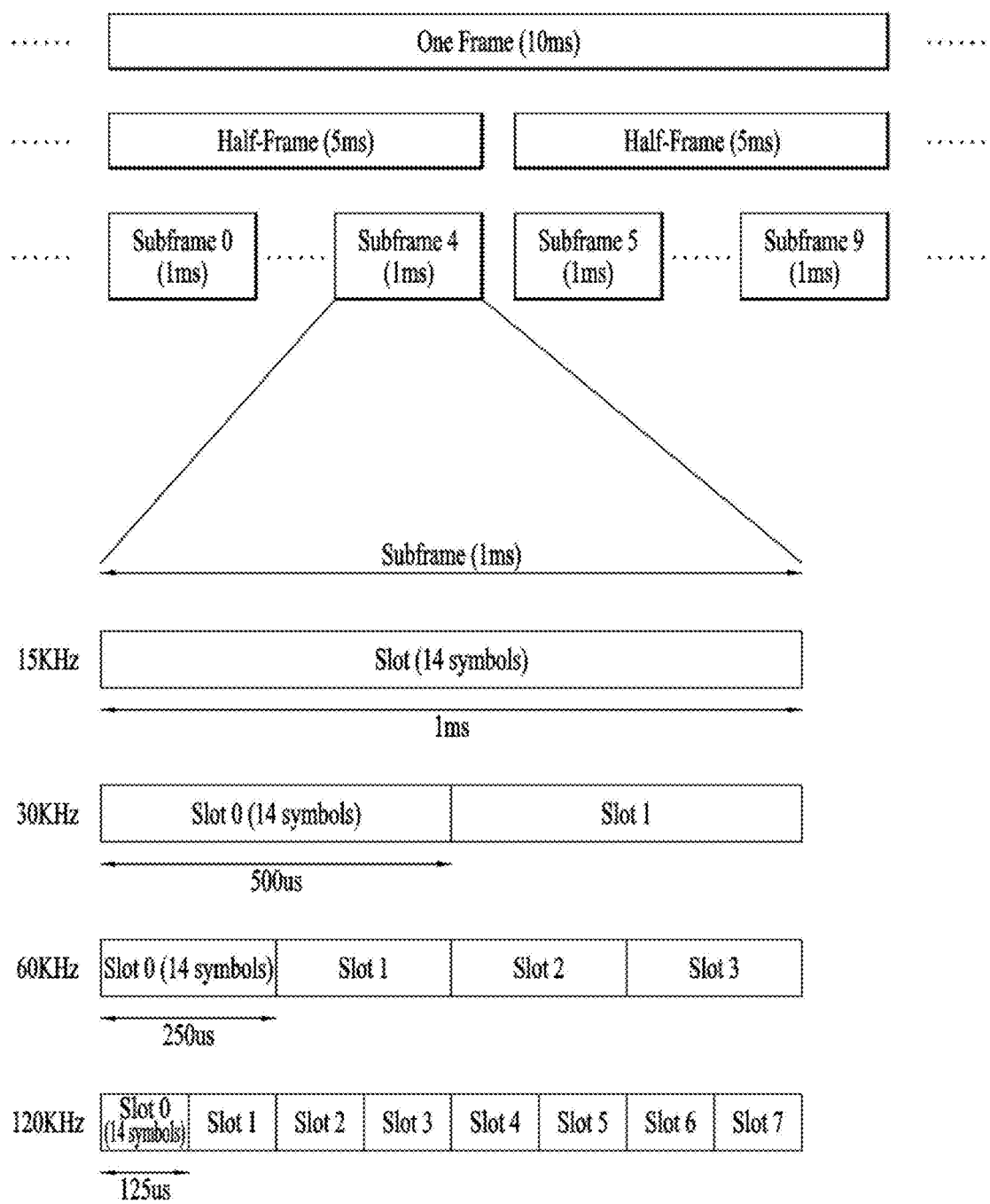
FIG. 5 is a diagram illustrating a radio frame structure in a 5G system.

FIG. 5 is a diagram illustrating a radio frame structure in NR.

In the NR system, UL and DL transmissions are performed in frames. One radio frame is 10 ms in duration, defined by two 5-ms half-frames. One half-frame is defined by five 1-ms subframes. One subframe is divided into one or more slots, and the number of slots in a subframe depends on a subcarrier spacing (SCS). Each slot includes 12 or 14 OFDM(A) symbols according to a cyclic prefix (CP). Each slot includes 14 symbols in a normal CP case, and 12 symbols in an extended CP case. Herein, a symbol may include an OFDM symbol (or a CP-OFDM symbol) and an SC-FDMA symbol (or a discrete Fourier transform-spread-orthogonal frequency division multiplexing (DFT-s-OFDM) symbol).

In the NR system, different OFDM(A) numerologies (e.g., SCSs, CP lengths, and so on) may be configured for a plurality of cells aggregated for a UE. Therefore, the (absolute) duration of a time resource (e.g., a subframe, slot, or TTI) (for the convenience of description, generically referred to as a time unit (TU)) including the same number of symbols may be different between the aggregated cells.

Figure 6:
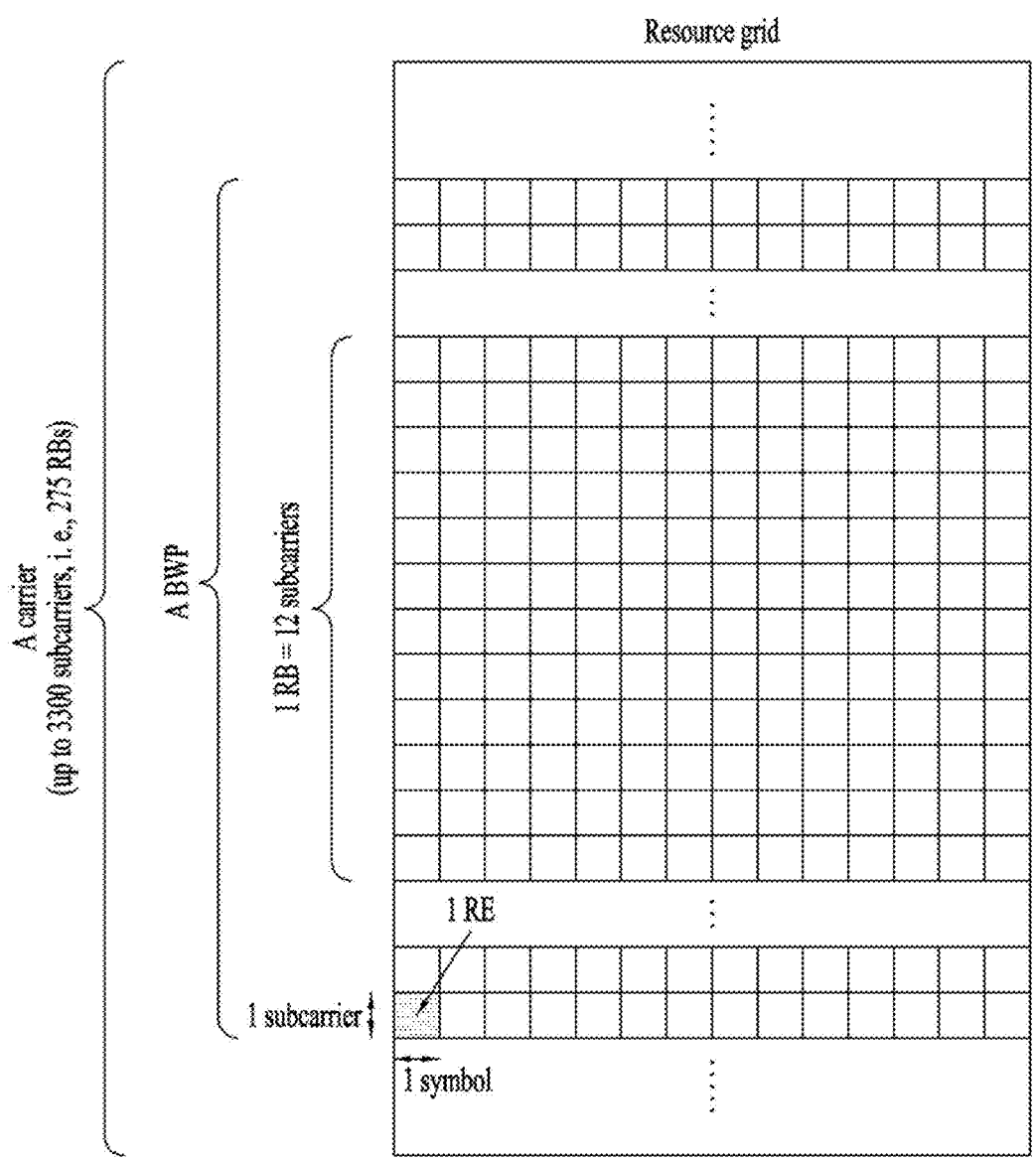
FIG. 6 is a diagram illustrating a slot structure in the 5G system.

FIG. 6 is a diagram illustrating a slot structure in the NR system. One slot includes a plurality of symbols in the time domain. For example, one slot includes 14 symbols in a normal CP case and 12 symbols in an extended CP case. A carrier includes a plurality of subcarriers in the frequency domain. An RB is defined by a plurality of (e.g., 12) consecutive subcarriers in the frequency domain. A bandwidth part (BWP), which is defined by a plurality of consecutive (P)RBs in the frequency domain, may correspond to one numerology (e.g., SCS, CP length, and so on). A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 7:
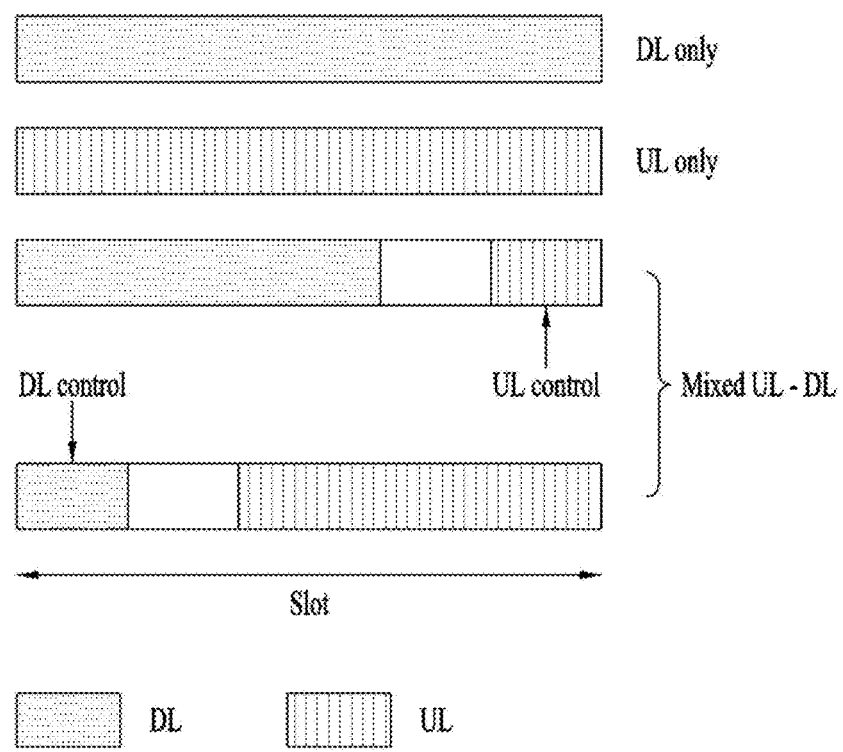
FIG. 7 is a diagram illustrating self-contained slot structures in the 5G system.

FIG. 7 is a diagram illustrating self-contained slot structures in the NR system.

In the NR system, a frame is characterized by a self-contained structure in which all of a DL control channel, DL or UL data, and a UL control channel may be included in one slot. For example, the first N symbols (referred to as a DL control region) of a slot may be used to carry a DL control channel, and the last M symbols (referred to as a UL control region) of the slot may be used to carry a UL control channel. Each of N and M is an integer equal to or larger than 0. A resource area (referred to as a data region) between the DL control region and the UL control region may be used for DL data transmission or UL data transmission. A time gap for DL-to-UL or UL-to-DL switching may exist between each control region and the data region. For example, the following configurations may be considered. Each period is arranged in time order.

1. DL only configuration
2. UL only configuration
3. Mixed UL-DL configuration
   DL region+GP (guard period)+UL control region
   DL control region+GP+UL region
   DL region: (i) DL data region, (ii) DL control region+DL data region
   UL region: (i) UL data region, (ii) UL data region+UL control region A PDCCH may be transmitted in the DL control region, and a PDSCH may be transmitted in the DL data region. A PUCCH may be transmitted in the UL control region, and a PUSCH may be transmitted in the UL data region. The PDCCH may deliver DCI, for example, DL data scheduling information and UL data scheduling information. The PUCCH may deliver UCI, for example, an ACK/NACK for DL data, CSI, and an SR. The GP provides a time gap during which a BS and a UE transition from a transmission mode to a reception mode or from the reception mode to the transmission mode. Some symbols at the time of DL-to-UL switching in a subframe may be configured as a GP.

To transmit data in a wide frequency band, while maintaining a high transmission rate for multiple users, the use of an ultra-high frequency band, that is, a millimeter frequency band at or above 6 GHz is considered in the NR system. The technique is called NR in the 3GPP, while it is referred to as an NR system in the present disclosure. However, the millimeter frequency band exhibits the frequency property that a signal is very rapidly attenuated according to a distance due to the use of too high a frequency band. Therefore, the NR system using a band at or above at least 6 GHz adopts a narrow beam transmission scheme in which a signal is transmitted with energy concentrated in a specific direction, not omni-directionally to compensate for rapid propagation attenuation and thus overcome coverage reduction caused by the rapid propagation attenuation. However, because one BS services a narrow range by one narrow beam alone, the BS covers a wideband with multiple narrow beams.

In a millimeter frequency band, that is, a millimeter wave (mmW) band, a wavelength is short, which enables installation of multiple antenna elements over the same area. For example, a total of 100 antenna elements may be installed in a two-dimensional array on a 5*5 cm panel at intervals of 0.5 lambda (wavelength) in a 30 GHz band with a wavelength of about 1cm. In the mmW system, therefore, to enhance coverage or increase throughput by increasing a beamforming gain using multiple antenna elements is under consideration.

To form a narrow beam in the millimeter frequency band, a beamforming scheme is mainly considered, in which energy is increased only in a specific direction by transmitting the same signal with appropriate phase differences through a large number of antennas at a BS or a UE. Such beamforming schemes include digital beamforming which generates a phase difference in a digital baseband signal, analog beamforming which generates a phase difference in a modulated analog signal based on a time delay (i.e., a cyclic shift), and hybrid beamforming using both digital beamforming and analog beamforming. The use of a transceiver unit (TXRU) per antenna element to enable transmission power control and phase control on an antenna element basis may lead to independent beamforming in each frequency resource. However, installation of TXRUs for all of about 100 antenna elements is not viable in terms of cost effectiveness. That is, because multiple antennas are to be used to compensate for rapid propagation attenuation in the millimeter frequency band, and digital beamforming requires as many radio frequency (RF) components (e.g., digital-to-analog converters (DACs), mixers, power amplifiers, and linear amplifiers) as the number of antennas, implementation of digital beamforming in the millimeter frequency band increases the prices of communication devices. Accordingly, when a large number of antennas are required as is the case with the millimeter frequency band, analog beamforming or hybrid beamforming is considered. In analog beamforming, multiple antenna elements are mapped to one TXRU and the direction of a beam is controlled by an analog phase shifter. Because only one beam direction is generated across a total band in analog beamforming, frequency selective beamforming is not possible. Hybrid beamforming is an intermediate scheme between digital beamforming and analog beamforming, in which there are B TXRUs fewer than Q antenna elements. Although there are differences depending on how the B TXRUs are connected to the Q antenna elements, the number of the directions of beams which may be simultaneously transmitted is limited to B or less in hybrid beamforming.

As described before, because a transmission or received digital baseband signal is subjected to signal processing in digital beamforming, the signal may be transmitted or received simultaneously in multiple directions by multiple beams. Compared to digital beamforming, a transmission or received analog signal is subjected to beamforming in a modulated state in analog beamforming. Therefore, the signal may not be transmitted or received simultaneously in multiple directions outside a range covered by one beam. In general, a BS communicates with multiple users at the same time through wideband transmission or based on a multi-antenna property. When the BS forms an analog beam in one beam direction in analog beamforming or hybrid beamforming, the BS communicates only with users within the same analog beam direction in view of the nature of analog beamforming. A method of allocating RACH resources and using BS resources according to the present disclosure is proposed in consideration of limitations inherent to analog beamforming or hybrid beamforming.

Figure 8:
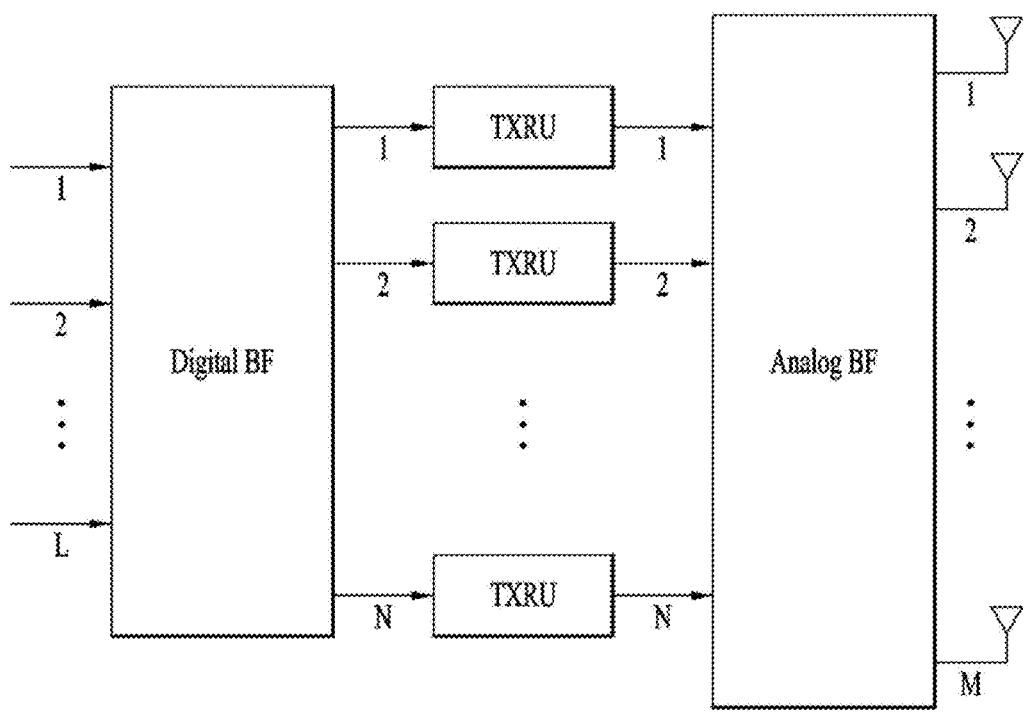
FIG. 8 is a diagram illustrating a hybrid beamforming structure from the perspective of transceiver units (TXRUs) and physical antennas.

FIG. 8 is a diagram illustrating a hybrid beamforming structure from the perspective of TXRUs and physical antennas.

Along with the use of multiple antennas, a hybrid beamforming scheme with digital beamforming and analog beamforming combined has been introduced. Analog beamforming (or RF beamforming) is an operation of performing precoding (or combining) at a transceiver (or RF unit). In hybrid beamforming, each of a baseband unit and a transceiver (or RF unit) performs precoding (or combining), thereby achieving performance approaching that of digital beamforming, with reduced numbers of RF chains and DACs (or analog-to-digital converters (ADCs)). For the convenience's sake, a hybrid beamforming structure may be represented by N TXRUs and M physical antennas. Digital beamforming for L data layers to be transmitted from a transmitter may be represented as an N-by-L matrix. Then, N digital signals are converted to analog signals through the TXRUs and subjected to analog beamforming represented as an M-by-N matrix.

In FIG. 8, the number of digital beams is L and the number of analog beams is N. The NR system seeks to support more efficient beamforming to a UE located in a specific area by designing a BS to change analog beamforming on a symbol basis. With one antenna panel defined by N TXRUs and M RF antennas, the introduction of a plurality of antenna panels to which independent hybrid beamforming is applicable is further under consideration in the NR system. As such, when the BS uses a plurality of analog beams, each UE may have a different analog beam suitable for signal reception. Accordingly, a beam sweeping operation is under consideration, in which a BS changes a plurality of analog beams to be applied on a symbol basis in a specific slot or subframe, for at least a synchronization signal, system information, paging, and so on, so that all UEs may have reception opportunities.

Figure 9:
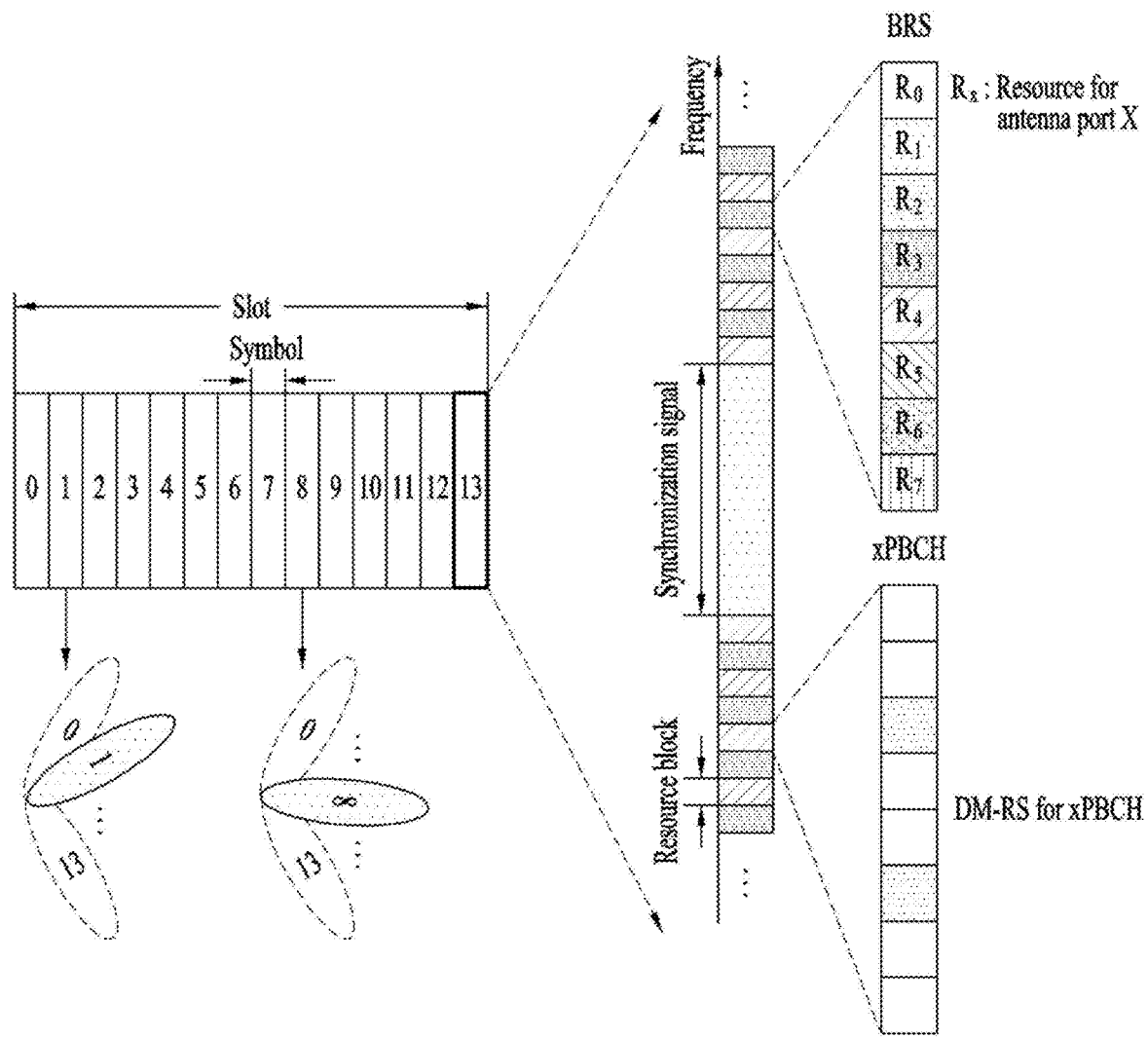
FIG. 9 is a diagram illustrating a beam sweeping operation for a synchronization signal and system information in a downlink transmission procedure.

FIG. 9 is a schematic diagram illustrating a beam sweeping operation for a synchronization signal and system information in a DL transmission procedure A physical resource (or physical channel) carrying system information in the NR system to which the present disclosure is applicable is referred to as an xPBCH. Analog beams from different antenna panels may be simultaneously transmitted in one symbol. As illustrated in FIG. 9, the introduction of a beam RS (BRS), an RS transmitted for a single analog beam corresponding to a specific antenna panel is under discussion to measure a channel for each analog beam. The BRS may be defined for a plurality of antenna ports, and each antenna port of the BRS may correspond to a single analog beam. Unlike the BRS, a synchronization signal or the xPBCH may be transmitted for all analog beams in an analog beam group, such that any UE may receive the signal successfully.

Figure 10:
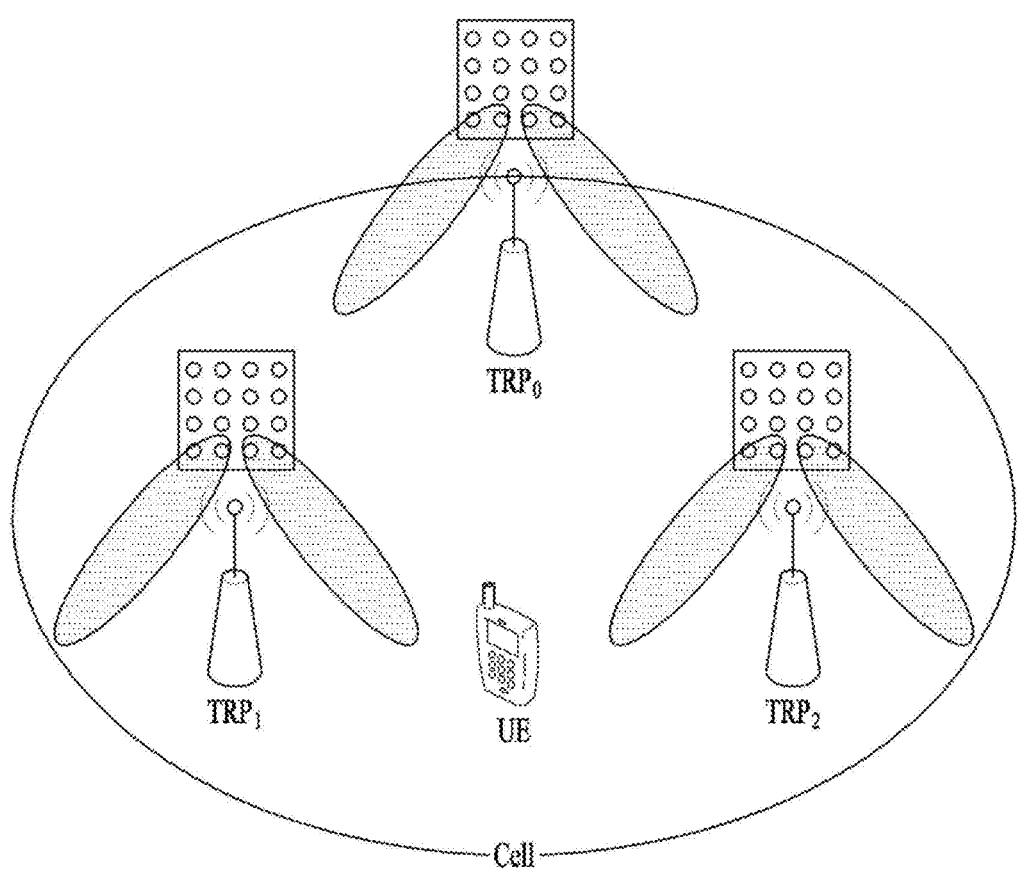
FIG. 10 is a diagram illustrating an exemplary cell in a new radio access technology (NR) system.

FIG. 10 illustrates an exemplary cell in the NR system.

Referring to FIG. 10, compared to a wireless communication system such as the legacy LTE system in which one BS covers one cell, configuring one cell with a plurality of transmission and reception points (TRPs) is under discussion in the NR system. When a plurality of TRPs cover one cell, seamless communication is possible and mobility management is facilitated for a UE, even though a TRP serving the UE is changed.

Compared to the LTE/LTE-A system in which the PSS/SSS is transmitted omni-directionally, a method of transmitting a signal such as a PSS/SSS/PBCH by beamforming, while sweeping beams in all beam directions at a gNB using mmWave is under consideration. This transmission/reception of a signal by sweeping beams in beam directions is referred to as beam sweeping or beam scanning. In the present disclosure, "beam sweeping" is a transmitter behavior, and "beam scanning" is a receiver behavior. For example, given up to N beam directions, the gNB transmits a signal such as a PSS/SSS/PBCH in each of the N beam directions. That is, the gNB transmits a synchronization signal such as the PSS/SSS/PBCH in each direction, while sweeping a beam in directions available to or supported by the gNB. Alternatively, when the gNB is capable of forming N beams, the gNB may group the beams into beam groups each including a few beams, and transmit/receive the PSS/SSS/PBCH on a beam group basis. One beam group includes one or more beams. The PSS/SSS/PBCH transmitted in the same direction may be defined as one SSB, and there may exist a plurality of SSBs within one cell. In the presence of a plurality of SSBs, SSB indexes may be used to distinguish the SSBs from each other. For example, when the PSS/SSS/PBCH is transmitted in 10 beam directions in a system, it may be understood that the PSS/SSS/PBCH transmitted in the same direction forms one SSB, and 10 SSBs exist in the system. In the present disclosure, a beam index may be interpreted as an SSB index.

Figure 11:
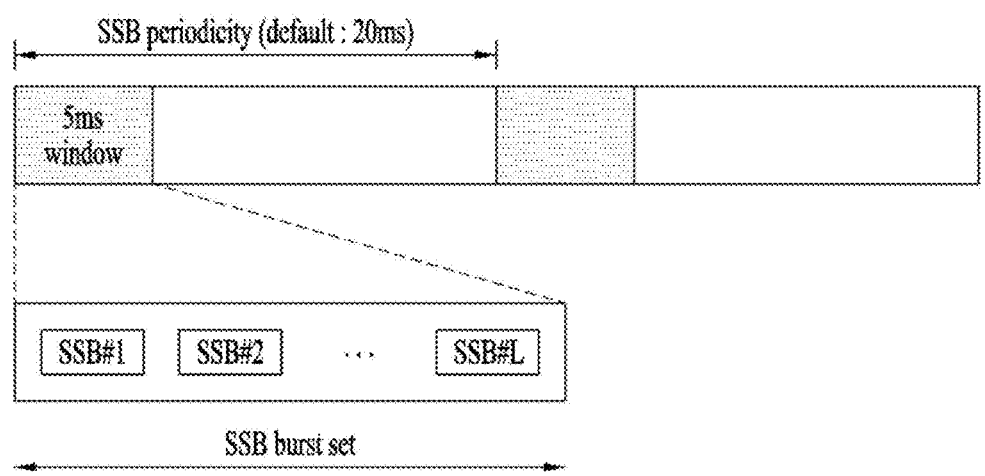
FIG. 11 is a diagram illustrating synchronization signal block (SSB) transmission.

FIG. 11 illustrates synchronization signal block (SSB) transmission.

An SSB includes an SS/PBCH block, and it is transmitted with an SSB periodicity. A default SSB periodicity used for initial cell selection is defined as 20 ms. After cell access, the SSB periodicity may be set to one of {5 ms, 10 ms, 20 ms, 40 ms, 80 ms, and 160 ms}. An SSB burst set may be configured at the beginning of each SSB periodicity. The SSB burst may have a time window of 5 ms, and the SSB may be transmitted in the SSB burst set at most L times. The candidate location of the SSB may be predefined within the SS burst set. The maximum number of SSB transmissions L may be given as follows depending on carrier frequency bands.

For frequency range up to 3 GHz, L=4
For frequency range from 3 GHz to 6 GHz, L=8
For frequency range from 6 GHz to 52.6 GHz, L=64

Based on the SSB, the UE may perform DL synchronization acquisition (e.g., OFDM symbol/slot/half-frame boundary detection), cell ID (e.g., physical cell identifier (PCID)) acquisition, beam alignment for initial access, mater information block (MIB) acquisition, DL measurement, etc.

Figure 12:
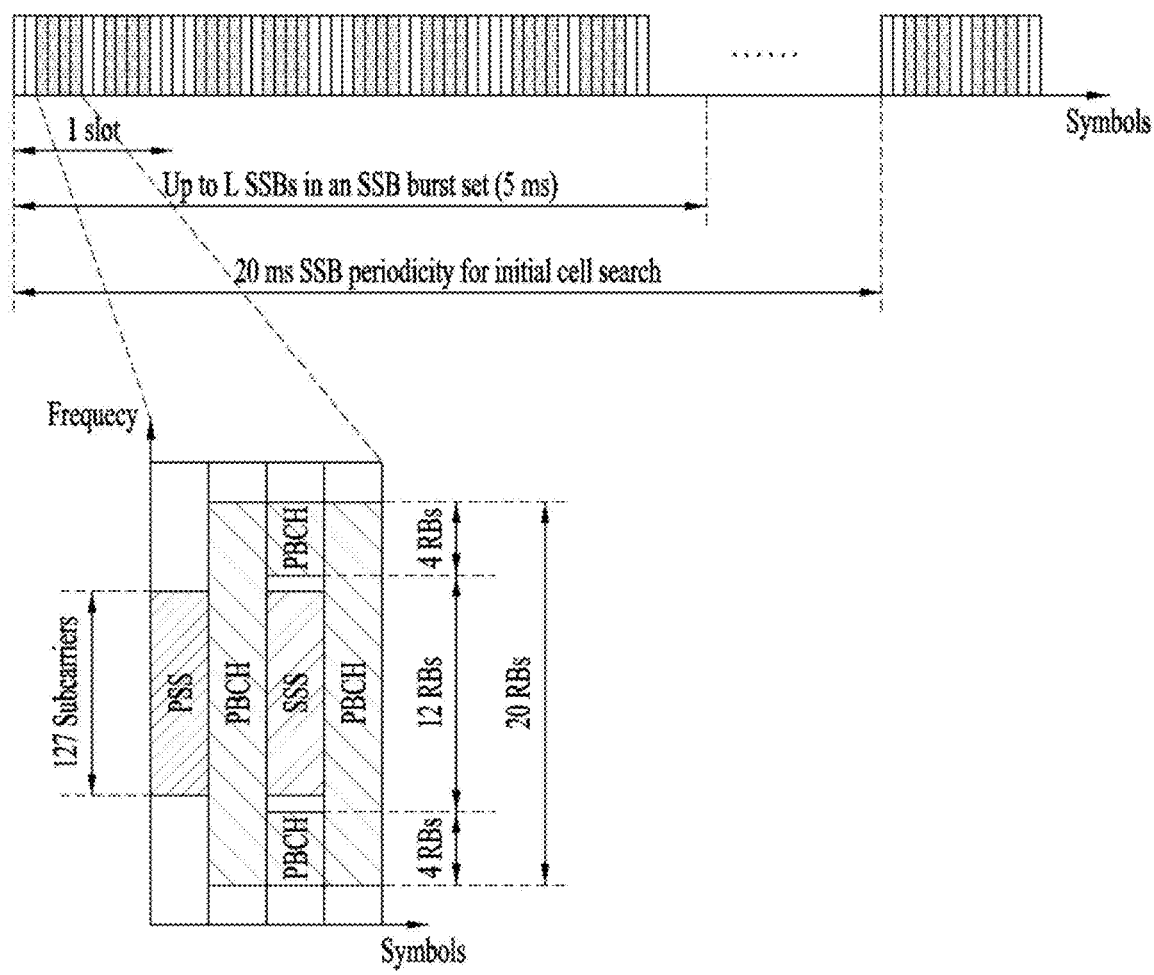
FIG. 12 is a diagram illustrating an SSB structure.

FIG. 12 illustrates an SSB structure. A slot may include at most two SSBs. An SSB includes four consecutive OFDM symbols, and a PSS, PBCH, SSS/PBCH and PBCH are transmitted in the OFDM symbols, respectively. The PSS may be used to detect a cell ID from a cell ID group, and the SSS may be used to detect the cell ID group. The PBCH is used to detect an SSB (time) index and a half-frame and includes an MIB. The PBCH includes a data RE and a demodulation reference signal (DMRS) RE in each OFDM symbol. Three DMRS REs are present in each RB, and three data REs are present between DMRS REs.

Table 6 shows the configuration of PBCH payload.

TABLE 1

| Field | Size (bits) |
|---|---|
| Cyclic Redundancy Check (CRC) | 24 |
| System Frame Number (SFN) | 10 |
| Physical RB (PRB) grid offset | 4 |
| SCS indication | 1 |
| Half frame Indication | 1 |
| Most Significant Bit (MSB) of SSB index (for above 6 GHz) | 3 |

The time locations (SSB indices) of the SSB are indexed from 0 to L−1 in an SSB burst set (i.e., half-frame). For L=8 or 64, the three least significant bits (LSBs) of the SSB index may be indicated by 8 different PBCH-DMRS sequences. For L=2, the two LSBs of the SSB index may be indicated by four different PBCH-DMRS sequences. For L=4, among three bits indicated by 8 PBCH-DMRS sequences, one remaining bit after indicating the SSB index may be used to indicate the half-frame.

A UE may obtain DL synchronization by detecting the SSB. Specifically, the UE may identify the structure of the SSB burst set by detecting the SSB index and then detect an OFDM symbol/slot/half-frame boundary. The number of the frame including the detected SSB may be identified based on SFN information in the MIB, and the number of the half-frame including the detected SSB may be identified based on half-frame indication information in the MIB.

The present disclosure relates to a method of changing a timing advance (TA) value for simultaneous transmission or reception between nodes in a wireless communication system supporting an integrated access and backhaul (IAB).

In recent years, a relay BS has been discussed to compensate for coverage holes and reduce wired connections between BSs in 3GPP Rel. 16, i.e., NR specifications. This is called the IAB. In this scenario, a donor gNB (DgNB) transmits a signal to a UE through the relay BS. The IAB includes a wireless backhaul link for communication between the DgNB and relay BS or between relay BSs and an access link for communication between the DgNB and UE or between the relay BS and UE.

There is a synchronization problem in the IAB scenario.

If the DgNB and IAB nodes respectively perform synchronization based on the global positioning system/global navigation satellite system (GPS/GNSS), an antenna for the GPS/GNSS needs to be installed in each node, and it requires high installation costs. To avoid such a problem, an over the air (OTA) method may be used. In other words, synchronization may be performed by transmission of a wireless signal. To this end, in the NR system, a BS may transmit to a UE an SSB, which is for synchronization between the BS and UE, and the UE may receive the SSB to achieve the synchronization.

When the SSB is used, the SSB transmitted from a parent node may experience a propagation delay and arrive at the IAB node. When the IAB nodes transmits the SSB to its child node, the SSB may experience an additional propagation delay. To overcome this problem, the IAB node may catch a DL reception timing from the parent node after the propagation delay but may equate a transmission timing to its child node or access UE with a transmission timing of the DgNB. To this end, if the IAB node transmits at a DL reception timing before about half of a TA value designated by its parent node, all nodes may have the same DL transmission timing values, and thus, the same synchronization may be applied to the access link for each IAB node.

However, in this case, there may be inefficiency in management. In the case of a TDD band, if all IAB nodes configure transmission timings for their child nodes or access UEs, the IAB nodes also configure reception timings for their child nodes or access UEs based on TA values with respect to the transmission timings. In this case, a mismatch may occur between the reception timing from the parent node and the reception timing from the child node by a propagation delay. Since the propagation delay is not a multiple of the OFDM symbol size, the mismatch between the reception timing from the parent node and the reception timing from the child node may correspond to a certain time point between symbols.

Accordingly, it may be difficult for the IAB node to receive from the parent and child nodes at the same time or transmit to the parent and child nodes at the same time. When the IAB node performs simultaneous reception, the performance may be significantly degraded due to inter-symbol interference (ISI). When the IAB node intends to perform simultaneous transmission, the IAB node needs to transmit at different timings at the same time. That is, the IAB nodes may not perform the simultaneous transmission unless the number of RFs increases. (The simultaneous transmission and reception may not be limited to between the parent and child nodes. For example, the simultaneous transmission and reception may be related to between the parent node and access UE or between the child node and access UE).

Figure 13:
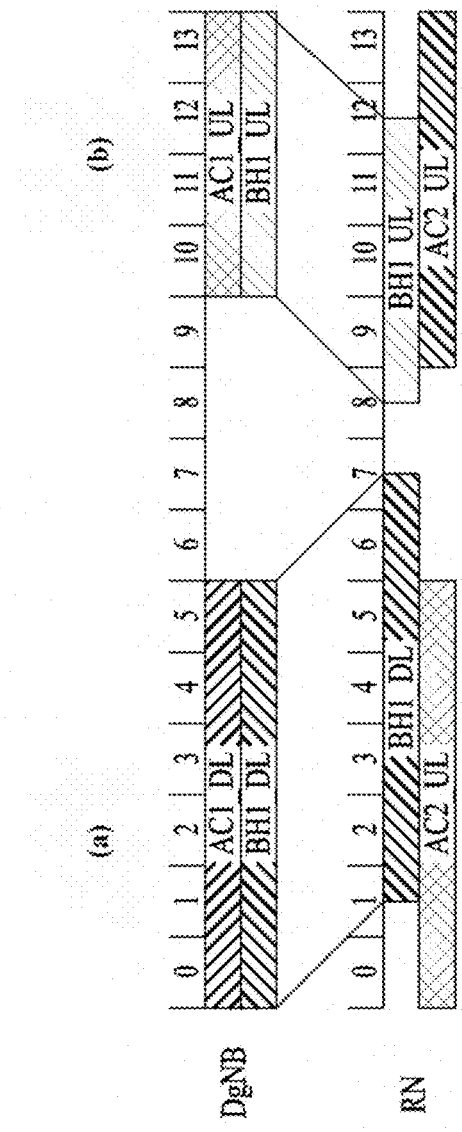
FIG. 13 is a diagram illustrating an example in which a relay node is incapable of performing simultaneous transmission or reception.

FIG. 13 illustrates an example for explaining the above problems.

FIG. 13 (a) shows reception operations of a relay node, i.e., reception of a DL signal from a DgNB or reception of a UL signal from an access UE.

In FIG. 13 (a), BH1_DL denotes a DL backhaul link between the DgNB and relay node, and AC2_UL denotes a UL access link between the relay node and UE connected to the relay node.

Assuming that synchronization is established in FIG. 3 (a), the relay node receives a DL signal from the DgNB at the reception timing of BH1_DL. Although the relay node attempts to receive a UL signal from the UE at the same time, the relay node receives the UL signal transmitted from the UE at a timing different from the reception timing of BH1_DL (AC2_UL).

FIG. 13 (b) shows transmission operations of the relay node, i.e., transmission of a UL signal to the DgNB and transmission of a DL signal to the UE.

BH1_UL denotes a UL backhaul link between the DgNB and relay node, and AC2_DL denotes a DL access link between the relay node and UE connected to the relay node.

The relay node transmits the UL signal to the DgNB at the transmission timing of BH1_UL in consideration of TA. Since the relay node transmits the DL signal to the UE at a symbol boundary, there may be a timing mismatch.

If the above problem is solved, that is, if simultaneous transmission and reception is enabled, resource efficiency may increase (for example, about two times). For the transmission and reception, beam coordination may be required to achieve reliability.

To this end, the following operations are proposed.

1. The IAB node (relay node) may assign a TA value to its child node or access UE and then inform a new TA value or a change in the TA value over a control channel in UL scheduling (UL grant). Thereafter, the child node or UE may reflect the new TA value or the change in the TA value in UL signal transmission when performing the scheduled operation. The changed TA value is a value that enables the IAB node to match the reception timing from its parent node (DL signal reception) and the reception timing from its child node or UE (UL signal reception). That is, the changed TA value may allow the IAB to dynamically perform simultaneous DL/UL signal reception.

A. In the current NR system, there are 64 TA values, and it may act as a burden in the size of DCI. The IAB node may be configured with several TA values or several changes in the TA value and then inform the child node or UE of one of them over the control channel.

2. The IAB node may inform the child node or UE of a new propagation delay value or a change in the propagation delay through or before DL scheduling (DL assignment) and determine the transmission timing of a PDSCH by reflecting the new propagation delay value or the change in the propagation delay when transmitting the PDSCH. Thereafter, the child node or UE may reflect the new propagation delay value or the change in the propagation delay in DL signal reception when performing scheduled DL operation. The changed propagation delay value is a value that enables the IAB node to match the transmission timing to its parent node (UL signal transmission) and the transmission timing to its child node or UE (DL signal transmission). That is, the changed propagation delay value may allow the IAB to dynamically perform simultaneous DL/UL signal transmission.

A. The granularity of propagation delay values may be large, and it may act as a burden in the size of DCI. The IAB node may be configured with several propagation delay values or several changes in the propagation delay value and then inform the child node or UE of one of them over the control channel.

Regarding the above description, several priority rules may be considered. For example, the IAB node may need to perform previously scheduled DL or UL transmission at an instance when UL or DL transmission with a different timing from its original UL or DL timing is scheduled.

For example, if a time at which the DgNB instructs the IAB node to perform UL transmission, i.e., a time at which the IAB node is scheduled by the DgNB to perform the UL transmission is equal to a time at which the IAB node performs DL transmission (e.g., SSB transmission) to its child node or UE by changing the propagation delay value, the IAB node may need to simultaneously perform the UL transmission to the parent node and the DL transmission (e.g., SSB transmission) to the UE according to a previously scheduled DL transmission timing. In this case, the IAB node may perform the scheduled UL transmission and SSB transmission at the same time. However, considering that the SSB transmission is more important than the UL transmission since it is used for synchronization or measurement, the IAB node may drop the UL transmission scheduled by the parent node and perform only the SSB transmission in the following cases.

1) A case in which the transmission timings of the UL signal and SSB are out of symbol boundaries 2) A case in which although the transmission timings of the UL signal and SSB are at symbol boundaries, there is a power transient time due to a difference between the transmission timings of the UL signal and SSB 3) A case in which although the transmission timings of the UL signal and SSB are at symbol boundaries, it is difficult to allocate power to both the UL signal transmission and the SSB transmission 4) A case in which although the transmission timings of the UL signal and SSB are at symbol boundaries, interference between the reception nodes causes performance degradation in simultaneous transmission The above cases may occur when the IAB node is scheduled to receive a DL signal from the parent node or receive a UL signal from the child node or UE. In this case, the IAB node may need to determine whether to receive the scheduled DL signal only or receive the UL signal from the child node or UE.

The following priority rule may be applied to the above situation. It is assumed that node G1 is the relay node, node G2 is the parent node (e.g., DgNB) of node G1, and node G3 is the child node (e.g., UE) of node G1.

1. When node G1 is scheduled for UL signal transmission by node G2 but needs to perform DL signal transmission to node G3, node G1 may drop signal transmission or reduce the power of a signal by considering the following priority rule.

A. SSB transmission may have the highest priority (the SSB transmission may be considered as the most important signal transmission since it is used for synchronization or measurement).

B. Transmission and reception to and from the parent node may be prioritized over transmission and reception to and from the child node. That is, transmission and reception to and from the DgNB may be prioritized over transmission and reception to and from the UE.

i. This may mean that the parent node or DgNB is prioritized since the parent node or DgNB is in charge of scheduling or control.

C. Aperiodic signal transmission may be prioritized over periodic signal transmission.

i. The reason for this is that the periodic transmission may be transmitted at the next opportunity but the aperiodic transmission has no transmission opportunity.

D. Transmission of an SIB, MIB, and/or SI may have the highest priority.

i. Since the SIB, MIB, and/or SI is important system information, the highest priority may be given thereto (in this case, the SIB, MIB, and/or SI transmission may have the same priority as that of the SSB transmission).

2. When node G1 is scheduled to receive a DL signal from node G2 but node G1 needs to receive a UL signal from node G3, node G1 may consider the following priority rule.

A. SSB transmission may have the highest priority (the SSB transmission may be considered as the most important signal transmission since it is used for synchronization or measurement).

B. Transmission and reception to and from the parent node may be prioritized over transmission and reception to and from the child node. That is, transmission and reception to and from the DgNB may be prioritized over transmission and reception to and from the UE.

i. This may mean that the parent node or DgNB is prioritized since the parent node or DgNB is in charge of scheduling or control.

C. Aperiodic signal transmission may be prioritized over periodic signal transmission.

i. The reason for this is that the periodic transmission may be transmitted at the next opportunity but the aperiodic transmission has no transmission opportunity.

D. Transmission of an SIB, MIB, and/or SI may have the highest priority.

i. Since the SIB, MIB, and/or SI is important system information, the highest priority may be given thereto (in this case, the SIB, MIB, and/or SI transmission may have the same priority as that of the SSB transmission).

Figure 14:
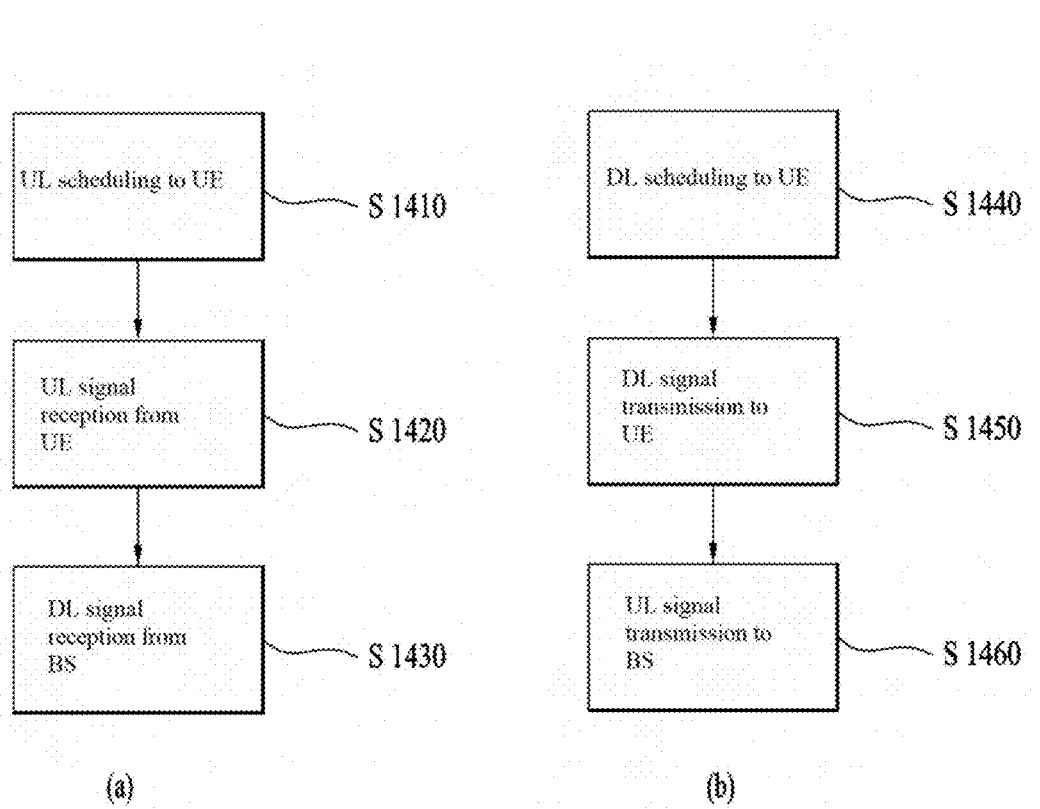
FIG. 14 is a diagram illustrating a process for a relay node to perform simultaneous transmission or reception according to an embodiment of the present disclosure.

FIG. 14 is a diagram illustrating a process for a relay node to perform simultaneous transmission or reception according to an embodiment of the present disclosure.

In the following description, it is assumed that a BS is the parent node of the relay node and a UE is the child node of the relay node. In addition, the parent node of the relay node may be another IAB node, and the child node of the relay node may be still another IAB node.

FIG. 13 (a) is a flowchart showing reception at the relay node.

The relay node may transmit to the UE a UL grant including information for changing a TA value (S1410). The information for changing the TA value may be either a TA value different from a previously configured TA value or a change in the TA value.

The UE may apply the TA value changed based on the received information to UL signal transmission. For example, if the UE receives the new TA value, the UE may transmit the UL signal by applying the new TA value. If the UE receives the change in the TA value, the UE may transmit the UL signal by applying a TA value obtained by applying the change in the TA value to the previous TA value.

The relay node may receive from the UE the UL signal to which the changed TA value is applied (S1420).

The relay node may receive a previously scheduled DL signal from the BS (S1430). In this case, the relay node may receive the UL signal to which the changed TA value is applied from the UE, and at the same time, receive the previously scheduled DL signal from the BS. That is, the information for changing the TA value included in the UL grant transmitted to the UE in step S1410 is information for adjusting the TA value such that the relay node is capable of receiving the UL signal from the UE, and at the same time, receiving the DL signal from the BS. For example, the information for changing the TA value included in the UL grant is information for adjusting the current TA value to simultaneously receive AC2_UL and BH1_DL shown in FIG. 13 (a).

In a specific situation that the relay node may not perform simultaneous reception, the relay node may receive either the DL signal from the BS or the UL signal from the UE in consideration of predetermined priorities.

FIG. 13 (b) is a flowchart showing transmission at the relay node.

The relay node may transmit to the UE a DL assignment including information for changing a propagation delay value (S1440). The information for changing the propagation delay value may be either a propagation delay value different from a previously configured propagation delay value or a change in the propagation delay value.

The relay node may apply the propagation delay value changed based on the information to DL signal transmission.

The relay node may transmit to the UE the DL signal to which the changed propagation delay value is applied (S1450).

The relay node may transmit a previously scheduled UL signal to the BS (S1460). In this case, the relay node may transmit the DL signal to which the changed propagation delay value is applied to the UE, and at the same time, transmit the previously scheduled UL signal to the BS. That is, the information for changing the propagation delay value included in the DL assignment transmitted to the UE in step S1440 is information for adjusting the propagation delay value such that the relay node is capable of transmitting the DL signal to the UE, and at the same time, transmitting the UL signal to the BS. For example, the information for changing the propagation delay value included in the DL assignment is information for adjusting the current propagation delay value to simultaneously transmit AC2_DL and BH1_UL shown in FIG. 13 (b).

In a specific situation that the relay node may not perform simultaneous reception, the relay node may transmit either the UL signal to the BS or the DL signal to the UE in consideration of predetermined priorities.

Figure 15:
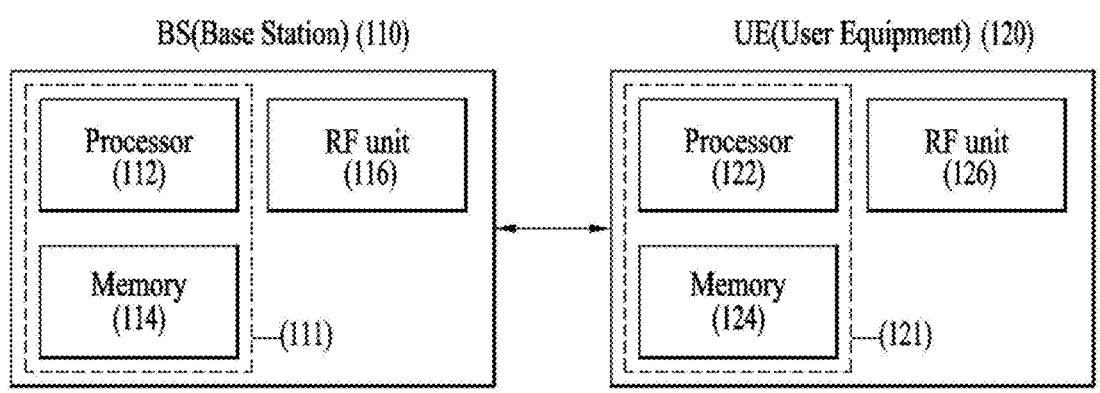
FIG. 15 is a diagram illustrating components of a wireless device applicable to the present disclosure.

FIG. 15 is a diagram illustrating components of a wireless device applicable to the present disclosure.

Referring to FIG. 15, a wireless communication system may include a BS 310 and a UE 320. When the wireless communication includes a relay, the BS or UE may be replaced with the relay. The BS or UE may be replaced with a network node, a wireless communication device, a vehicle, an autonomous driving vehicle, a drone (unmanned aerial vehicle (UAV)), an artificial intelligence (AI) module, a robot, an AR device, a VR device, etc.

For example, the UE may include a mobile phone, a smartphone, a laptop computer, a digital broadcast terminal, a personal digital assistant (PDA), a portable multimedia player (PMP), a navigation device, a slate personal computer (PC), a tablet PC, an ultrabook, a wearable device (e.g., a smartwatch, a smart glass, a head mounted display (HMD), etc.), a foldable device, etc. For example, the drone may be a flying object controlled by radio control signals without a human pilot. For example, the HMD may be a display device worn on the head of a user. The HMD may be used to realize VR or AR.

The BS 310 may include a processor 312, a memory 314, and a radio frequency (RF) unit 316. The processor 312 may be configured to perform the described/proposed procedures and methods by controlling the memory 314 and/or the RF unit 316. For example, the processor 312 may generate first information and/or a first signal by processing information in the memory 314 and then control the RF unit 316 to transmit a radio signal containing the first information/signal. The processor 312 may control the RF unit 316 to receive a radio signal containing second information and/or a second signal and then control the memory 314 to store information obtained by processing the second information/signal. The processor 312 may include a communication modem designed suitable for a wireless communication technology (e.g., LTE, NR, etc.). The memory 314 may be connected to the processor 312 and configured to store various information on the operations of the processor 312. For example, the memory 314 may store software code including commands for performing some or all of the processes controlled by the processor 312 or the described/proposed procedures and methods. The RF unit 316 may be connected to the processor 312 and configured to transmit and/or receive a radio signal. The RF unit 316 may include a transmitter and/or a receiver. The RF unit 316 may be replaced with a transceiver. The processor 312 and the memory 314 may be included in a processing chip 311 (e.g., system on chip (SOC).

The UE 320 may include a processor 322, a memory 324, and an RF unit 326. The processor 322 may be configured to perform the described/proposed procedures and methods by controlling the memory 324 and/or the RF unit 326. For example, the processor 322 may generate third information or a third signal by processing information in the memory 324 and then control the RF unit 326 to transmit a radio signal containing the third information/signal. The processor 322 may control the RF unit 326 to receive a radio signal containing fourth information or a fourth signal and then control the memory 324 to store information obtained by processing the fourth information/signal. The processor 322 may include a communication modem designed suitable for a wireless communication technology (e.g., LTE, NR, etc.). The memory 324 may be connected to the processor 322 and configured to store various information on the operations of the processor 322. For example, the memory 324 may store software code including commands for performing some or all of the processes controlled by the processor 322 or the described/proposed procedures and methods. The RF unit 326 may be connected to the processor 322 and configured to transmit and/or receive a radio signal. The RF unit 326 may include a transmitter and/or a receiver. The RF unit 326 may be replaced with a transceiver. The processor 322 and the memory 324 may be included in a processing chip 321 (e.g., system on chip (SOC)).

Artificial Intelligence (AI)

AI refers to the field of studying AI or methodology for making the same, and machine learning refers to the field of defining various issues dealt with in the AI field and studying methodology for solving the various issues. The machine learning is defined as an algorithm that enhances the performance of a certain task through consistent experiences with the task.

An artificial neural network (ANN) is a model used in the machine learning and may mean a whole model of problem-solving ability which is composed of artificial neurons (nodes) that form a network by synaptic connections. The ANN may be defined by a connection pattern between neurons in different layers, a learning process for updating model parameters, and an activation function for generating an output value.

The ANN may include an input layer, an output layer, and optionally one or more hidden layers. Each layer includes one or more neurons, and the ANN may include a synapse that links neurons. In the ANN, each neuron may output the function value of the activation function for input signals, weights, and bias input through the synapse.

The model parameter refers to a parameter determined through learning and includes the weight value of a synaptic connection and the bias of a neuron. A hyperparameter means a parameter to be set in the machine learning algorithm before learning and includes a learning rate, a repetition number, a mini-batch size, and an initialization function.

The purpose of the learning of the ANN may be to determine the model parameter that minimizes a loss function. The loss function may be used as an index to determine the optimal model parameter in the learning process of the ANN.

Machine learning may be classified into supervised learning, unsupervised learning, and reinforcement learning according to learning mechanisms.

The supervised learning may refer to a method of training the ANN in a state that labels for learning data are given, and the label may mean a correct answer (or result value) that the ANN must infer when the learning data is input to the ANN. The unsupervised learning may refer to a method of training the ANN in a state that labels for learning data are not given. The reinforcement learning may refer to a method of learning an agent defined in a certain environment to select a behavior or a behavior sequence that maximizes cumulative compensation in each state.

Machine learning implemented with a deep neural network (DNN) including a plurality of hidden layers among ANNs is referred to as deep learning. The deep running is part of the machine running. The machine learning used herein includes the deep running.

Robot

A robot may refer to a machine that automatically processes or operates a given task based on its own ability. In particular, a robot having a function of recognizing an environment and making a self-determination may be referred to as an intelligent robot.

Robots may be classified into industrial robots, medical robots, home robots, military robots, etc. according to use purposes or fields.

The robot may include a driving unit having an actuator or a motor and perform various physical operations such as moving a robot joint. In addition, a movable robot may include a driving unit having a wheel, a brake, a propeller, etc. and may travel on the ground or fly in the air through the driving unit.

Autonomous Driving (Self-Driving)

Autonomous driving refers to a technique of driving by itself. An autonomous driving vehicle refers to a vehicle moving with no user manipulation or with minimum user manipulation.

For example, the autonomous driving may include a technology for maintaining a current lane, a technology for automatically adjusting a speed such as adaptive cruise control, a technique for automatically moving along a predetermined route, and a technology for automatically setting a route and traveling along the route when a destination is determined.

The vehicle may include a vehicle having only an internal combustion engine, a hybrid vehicle having an internal combustion engine and an electric motor together, and an electric vehicle having only an electric motor. Further, the vehicle may include not only an automobile but also a train, a motorcycle, etc.

The autonomous driving vehicle may be regarded as a robot having the autonomous driving function.

Extended Reality (XR)

Extended reality is collectively referred to as virtual reality (VR), augmented reality (AR), and mixed reality (MR). The VR technology provides real-world objects and backgrounds as CG images, the AR technology provides virtual CG images on real object images, and the MR technology is a computer graphic technology of mixing and combining virtual objects with the real world.

The MR technology is similar to the AR technology in that real and virtual objects are shown together. However, the MR technology is different from the AR technology in that the AR technology uses virtual objects to complement real objects, whereas the MR technology deal with virtual and real objects in the same way.

The XR technology may be applied to a HMD, a head-up display (HUD), a mobile phone, a tablet PC, a laptop computer, a desktop computer, a TV, a digital signage, etc. A device to which the XR technology is applied may be referred to as an XR device.

Figure 16:
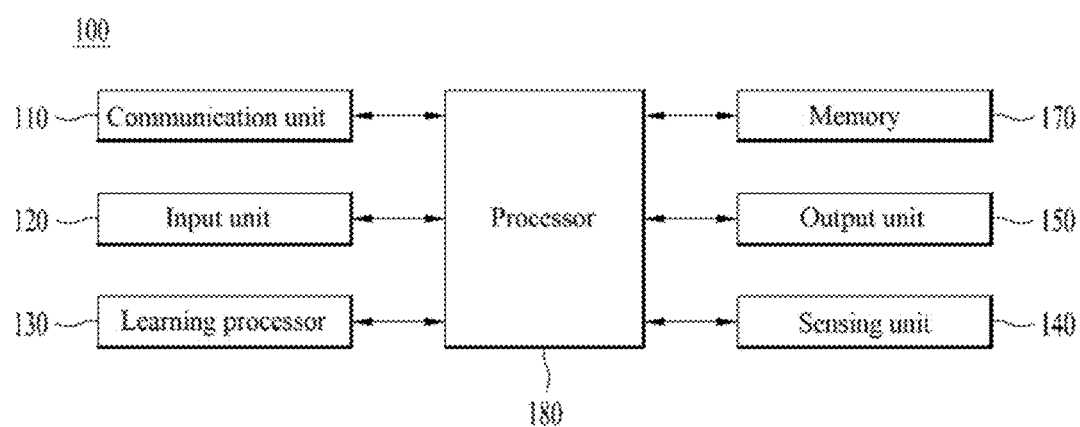
FIG. 16 is a diagram illustrating an AI device according to an embodiment of the present disclosure.

FIG. 16 illustrates an AI device 100 according to an embodiment of the present disclosure.

The AI device 100 may be implemented by a stationary or mobile device, for example, a TV, a projector, a mobile phone, a smartphone, a desktop computer, a laptop computer, a digital broadcasting terminal, a personal digital assistant (PDA), a portable multimedia player (PMP), a navigation device, a tablet PC, a wearable device, a set-top box (STB), a digital multimedia broadcasting (DMB) receiver, a radio, a washing machine, a refrigerator, a desktop computer, a digital signage, a robot, a vehicle, etc.

Referring to FIG. 16, the AI device 100 may include a communication unit 110, an input unit 120, a learning processor 130, a sensing unit 140, an output unit 150, a memory 170, and a processor 180.

The communication unit 110 may transmit and receive data to and from external devices such as an AI server 200 and other AI devices 100a to 100e based on wired or wireless communication technology. For example, the communication unit 110 may transmit and receive sensor information, user inputs, learning models, and control signals to and from the external devices.

The communication technology used by the communication unit 110 includes Global System for Mobile communication (GSM), Code Division Multiple Access (CDM), Long Term Evolution (LTE), 5G, Wireless Local Area Network (WLAN), Wireless Fidelity (Wi-Fi), Bluetooth™, Radio Frequency Identification (RFID), Infrared Data Association (IrDA), ZigBee, Near Field Communication (NFC), etc.

The input unit 120 may obtain various types of data.

The input unit 120 may include a camera for inputting a video signal, a microphone for receiving an audio signal, and a user input unit for receiving information from a user. The camera or microphone may be treated as a sensor, and the signal obtained from the camera or microphone may be considered as sensing data or sensor information.

The input unit 120 may obtain learning data for a learning model and input data to be used when an output is obtained based on the learning model. The input unit 120 may obtain raw input data. In this case, the processor 180 or learning processor 130 may extract an input feature by preprocessing the input data.

The learning processor 130 may train a model configured with an ANN based on the learning data. Here, the trained ANN may be referred to as the learning model. The learning model may be used to infer a result value for new input data rather than the learning data, and the inferred value may be used as a basis for determining whether to perform a certain operation.

In this case, the learning processor 130 may perform AI processing together with a learning processor 240 of the AI server 200.

The learning processor 130 may include a memory integrated with or implemented in the AI device 100. Alternatively, the learning processor 130 may be implemented with the memory 170, an external memory directly coupled to the AI device 100, or a memory in an external device.

The sensing unit 140 may obtain at least one of internal information of the AI device 100, surrounding environment information of the AI device 100, and user information using various sensors.

The sensor included in the sensing unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a LIDAR, a radar, and the like.

The output unit 150 may generate an output related to visual, audible, or tactile sense.

The output unit 150 may include a display unit for outputting visual information, a speaker for outputting audible information, a haptic module for outputting tactile information, and the like.

The memory 170 may store data supporting various functions of the AI device 100. For example, the memory 170 may store input data, learning data, learning models, learning histories, etc. obtained by the input unit 120.

The processor 180 may determine at least one executable operation of the AI device 100 based on information determined or generated by a data analysis algorithm or machine learning algorithm. The processor 180 may control the components of the AI device 100 to perform the determined operation.

To this end, the processor 180 may request, search for, receive, or employ data of the learning processor 130 or memory 170 and control the components of the AI device 100 to execute an expected or preferable operation or among the one or more executable operations.

If the processor 180 requires association with an external device to perform the determined operation, the processor 180 may generate a control signal for controlling the corresponding external device and transmit the generated control signal to the external device.

The processor 180 may obtain intention information from a user input and determine the intention of the user based on the obtained intention information.

In this case, the processor 180 may obtain the intention information corresponding to the user input using at least one of a speech to text (STT) engine for converting a voice input into a character string or a natural language processing (NLP) engine for obtaining intention information from a natural language.

At least one of the STT engine and the NLP engine may be configured with the ANN of which at least a part is trained according to the machine learning algorithm. At least one of the STT engine and the NLP engine may be trained by the learning processor 130, by the learning processor 240 of the AI server 200, or by distributed processing thereof.

The processor 180 may collect history information including user feedback on the operation of the AI device 100 and details thereof. The processor 180 may store the history information in the memory 170 or learning processor 130 or transmit the history information to an external device such as the AI server 200. The collected history information may be used to update the learning model.

The processor 180 may control at least some of the components of the AI device 100 to drive an application program stored in the memory 170. Further, the processor 180 may operate two or more of the components included in the AI device 100 in combination to drive the application program.

Figure 17:
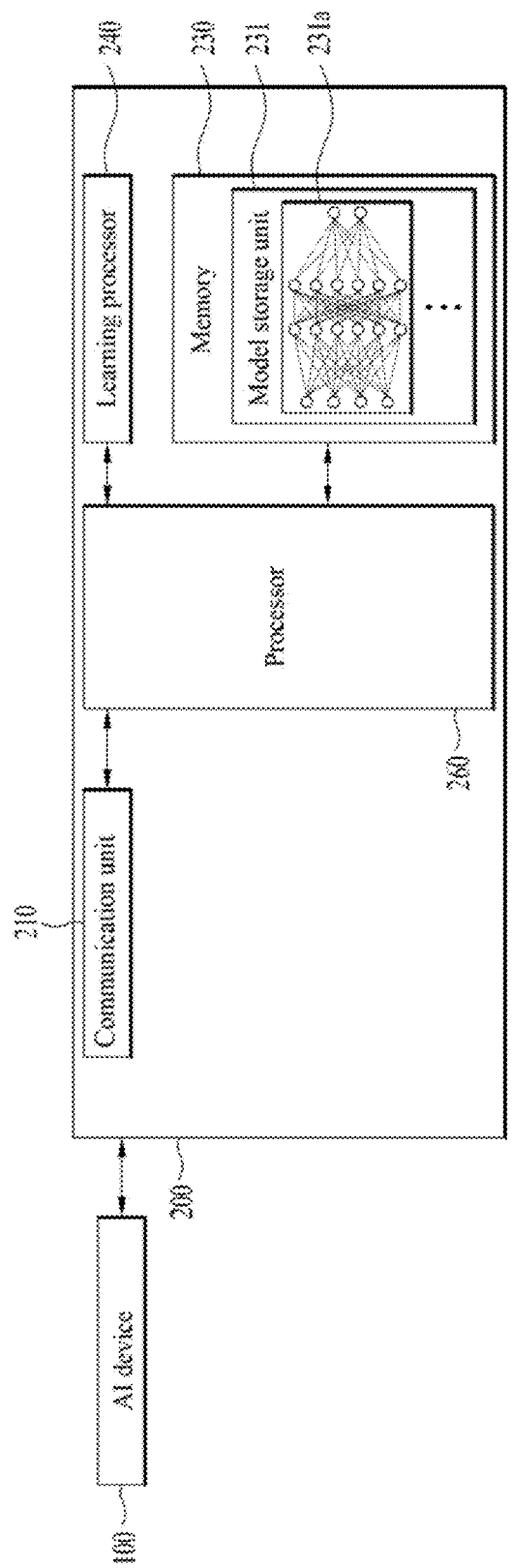
FIG. 17 is a diagram illustrating an AI server according to an embodiment of the present disclosure.

FIG. 17 illustrates the AI server 200 according to an embodiment of the present disclosure.

Referring to FIG. 17, the AI server 200 may mean a device for training an ANN based on a machine learning algorithm or a device for using a trained ANN. Here, the AI server 200 may include a plurality of servers to perform distributed processing or may be defined as a 5G network. The AI server 200 may be included as a part of the AI device 100 to perform at least part of AI processing together.

The AI server 200 may include a communication unit 210, a memory 230, the learning processor 240, a processor 260, and the like.

The communication unit 210 may transmit and receive data to and from an external device such as the AI device 100.

The memory 230 may include a model storage unit 231. The model storage unit 231 may store a model being trained or trained (or an ANN 231a) through the learning processor 240.

The learning processor 240 may train the ANN 231a based on learning data. The ANN, i.e., a learning model may be included in the AI server 200 or in an external device such as the AI device 100.

The learning model may be implemented by hardware, software or a combination thereof. If a part or the entirety of the learning model is implemented with software, one or more instructions for the learning model may be stored in the memory 230.

The processor 260 may infer a result value for new input data based on the learning model and generate a response or control command based on the inferred result value.

Figure 18:
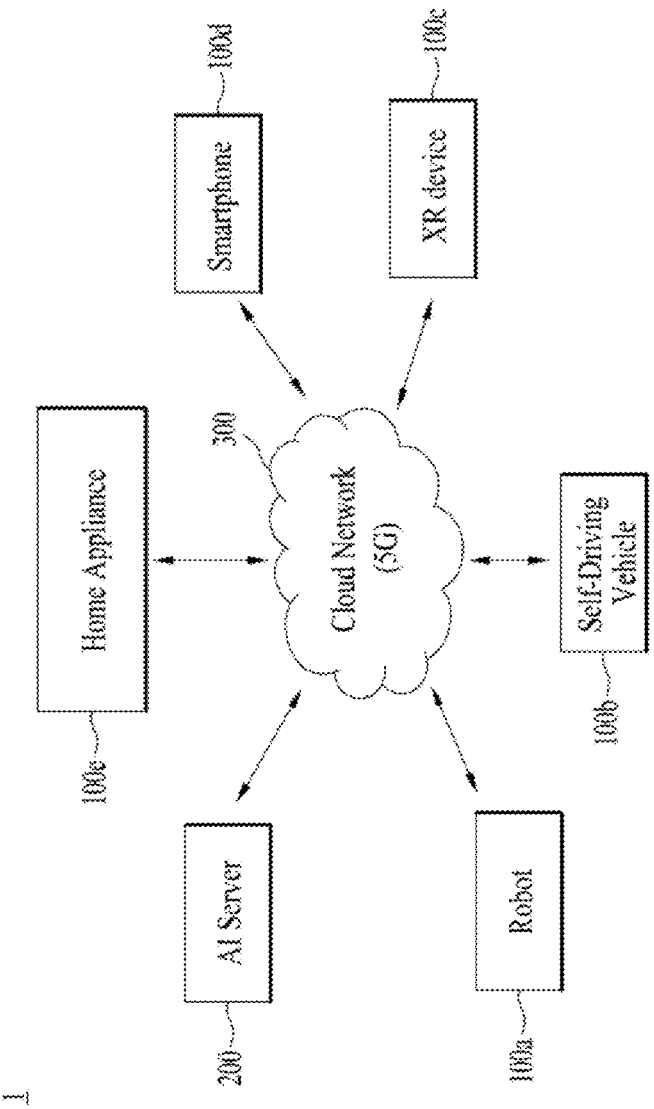
FIG. 18 is a diagram illustrating an AI system according to an embodiment of the present disclosure.

FIG. 18 illustrates an AI system 1 according to an embodiment of the present disclosure.

Referring to FIG. 18, at least one of the AI server 200, a robot 100a, an autonomous driving vehicle 100b, an XR device 100c, a smartphone 100d, and a home appliance 100e is connected to a cloud server 10 in the AI system 1. Here, the robot 100a, the autonomous vehicle 100b, the XR device 100c, the smartphone 100d, or the home appliance 100e, to which the AI technology is applied, may be referred to as an AI device 100a to 100e.

The cloud network 10 may refer to a network configuring part of a cloud computing infrastructure or a network existing in the cloud computing infrastructure. Here, the cloud network 10 may be configured with a 3G network, a 4G or LTE network, or a 5G network.

That is, each of the devices 100a to 100e and 200 included in the AI system 1 may be connected to each other through the cloud network 10. In particular, the devices 100a to 100e and 200 may communicate with each other through a BS or may communicate with each other directly without the BS.

The AI server 200 may include a server in charge of AI processing and a server in charge of big data computation.

The AI server 200 may be connected to at least one of the robot 100a, the autonomous vehicle 100b, the XR device 100c, the smartphone 100d, or the home appliance 100e included in the AI system 1 via the cloud network 10 and help at least part of AI processing of the connected AI devices 100a to 100e.

In this case, the AI server 200 may train an ANN according to a machine learning algorithm on behalf of the AI devices 100a to 100e and directly store or transmit a learning model to the AI devices 100a to 100e.

The AI server 200 may receive input data from the AI devices 100a to 100e, infer a result value for the received input data based on the learning model, generate a response or control command based on the inferred result value, and transmit the response or control command to the AI devices 100a to 100e.

Alternatively, the AI devices 100a to 100e may directly infer the result value for the input data based on the learning model and generate the response or control command based on the inferred result value.

Hereinafter, various embodiments of the AI devices 100a to 100e to which the above-described technology is applied will be described. The AI devices 100a to 100e illustrated in FIG. 3 may be considered as a specific example of the AI device 100 illustrated in FIG. 1.

AI+Robot

If the AI technology is applied to the robot 100a, the robot 100a may be implemented as a guide robot, a transport robot, a cleaning robot, a wearable robot, an entertainment robot, a pet robot, an unmanned flying robot, etc.

The robot 100a may include a robot control module for controlling an operation, and the robot control module may refer to a software module or a chip implemented by hardware.

The robot 100a may obtain state information of the robot 100a, detect (recognize) a surrounding environment and objects, generate map data, determine a travel route or driving plan, or determine a response or action to user interaction by using sensor information obtained from various types of sensors.

To determine the travel route or driving plan, the robot 100a may use sensor information obtained from at least one of the following sensors: a LIDAR, a radar, and a camera to determine a movement route and a travel plan.

The robot 100a may perform the above-described operations based on a learning model configured with at least one ANN. For example, the robot 100a may recognize the surrounding environment and objects based on the learning model and determine an operation based on the recognized surrounding environment or object. Here, the learning model may be directly trained by the robot 100a or by an external device such as the AI server 200.

The robot 100a may operate by directly generating a result based on the learning model. Alternatively, the robot 100a may transmit sensor information to the external device such as the AI server 200 and receive a result generated based on the sensor information.

The robot 100a may determine the travel route and driving plan based on at least one of the map data, the object information detected from the sensor information, or the object information obtained from the external device. Then, the robot 100a may move according to the determined travel path and driving plan under control of its driving unit.

The map data may include object identification information about various objects placed in a space in which the robot 100a moves. For example, the map data may include object identification information about fixed objects such as walls and doors and movable objects such as flower pots and desks. The object identification information may include a name, a type, a distance, a position, etc.

The robot 100a may operate and move by controlling the driving unit based on the user control/interaction. In this case, the robot 100a may obtain intention information from the motion or speech of the user and determine a response based on the obtained intention information.

AI+Autonomous Driving

If the AI technology is applied to the autonomous driving vehicle 100b, the autonomous driving vehicle 100b may be implemented as a mobile robot, a vehicle, an unmanned flying vehicle, etc.

The autonomous driving vehicle 100b may include an autonomous driving control module for controlling the autonomous driving function, and the autonomous driving control module may refer to a software module or a chip implemented by hardware. The autonomous driving control module may be included in the autonomous driving vehicle 100b as a component thereof, but it may be implemented with separate hardware and connected to the outside of the autonomous driving vehicle 100b.

The autonomous driving vehicle 100b may obtain state information about the autonomous driving vehicle 100b based on sensor information acquired from various types of sensors, detect (recognize) a surrounding environment and objects, generate map data, determine a travel route and driving plan, or determine an operation.

Similarly to the robot 100a, the autonomous driving vehicle 100b may use the sensor information obtained from at least one of the following sensors: a LIDAR, a radar, and a camera so as to determine the travel route and driving plan.

In particular, the autonomous driving vehicle 100b may recognize an environment and objects in an area hidden from view or an area over a certain distance by receiving the sensor information from external devices. Alternatively, the autonomous driving vehicle 100b may receive information, which is recognized by the external devices.

The autonomous driving vehicle 100b may perform the above-described operations based on a learning model configured with at least one ANN. For example, the autonomous driving vehicle 100b may recognize the surrounding environment and objects based on the learning model and determine the driving path based on the recognized surrounding environment and objects. The learning model may be trained by the autonomous driving vehicle 100a or an external device such as the AI server 200.

The autonomous driving vehicle 100b may operate by directly generating a result based on the learning model. Alternatively, the autonomous driving vehicle 100b may transmit sensor information to the external device such as the AI server 200 and receive a result generated based on the sensor information.

The autonomous driving vehicle 100b may determine the travel route and driving plan based on at least one of the map data, the object information detected from the sensor information, or the object information obtained from the external device. Then, the autonomous driving vehicle 100b may move according to the determined travel path and driving plan under control of its driving unit.

The map data may include object identification information about various objects placed in a space (e.g., road) in which the autonomous driving vehicle 100b moves. For example, the map data may include object identification information about fixed objects such as street lamps, rocks, and buildings and movable objects such as vehicles and pedestrians. The object identification information may include a name, a type, a distance, a position, etc.

The autonomous driving vehicle 100b may operate and move by controlling the driving unit based on the user control/interaction. In this case, the autonomous driving vehicle 100b may obtain intention information from the motion or speech of a user and determine a response based on the obtained intention information.

AI+XR

When the AI technology is applied to the XR device 100c, the XR device 100c may be implemented as a HMD, a HUD mounted in vehicles, a TV, a mobile phone, a smartphone, a computer, a wearable device, a home appliance, a digital signage, a vehicle, a fixed robot, a mobile robot, etc.

The XR device 100c may analyze three-dimensional point cloud data or image data obtained from various sensors or external devices, generate position data and attribute data for three-dimensional points, obtain information about a surrounding environment or information about a real object, perform rendering to on an XR object, and then output the XR object. For example, the XR device 100c may output an XR object including information about a recognized object, that is, by matching the XR object with the recognized object.

The XR device 100c may perform the above-described operations based on a learning model configured with at least one ANN. For example, the XR device 100c may recognize the real object from the three-dimensional point cloud data or image data based on the learning model and provide information corresponding to the recognized real object. The learning model may be directly trained by the XR device 100c or an external device such as the AI server 200.

The XR device 100c may operate by directly generating a result based on the learning model. Alternatively, the XR device 100c may transmit sensor information to the external device such as the AI server 200 and receive a result generated based on the sensor information.

<AI+Robot+Autonomous Driving>

When the AI technology and the autonomous driving technology are applied to the robot 100a, the robot 100a may be implemented as a guide robot, a transport robot, a cleaning robot, a wearable robot, an entertainment robot, a pet robot, an unmanned flying robot, etc.

The robot 100a to which the AI technology and the autonomous driving technology are applied may refer to the robot 100a with the autonomous driving function or the robot 100a interacting with the autonomous driving vehicle 100b.

The robot 100a having the autonomous driving function may be collectively referred to as a device that move along a given movement path without human control or a device that moves by autonomously determining its movement path.

The robot 100a having the autonomous driving function and the autonomous driving vehicle 100b may use a common sensing method to determine either a travel route or a driving plan. For example, the robot 100a having the autonomous driving function and the autonomous driving vehicle 100b may determine either the travel route or the driving plan based on information sensed through a LIDAR, a radar, and a camera.

The robot 100a interacting with the autonomous driving vehicle 100b may exist separately from with the autonomous driving vehicle 100b. That is, the robot 100a may perform operations associated with the autonomous driving function inside or outside the autonomous driving vehicle 100b or interwork with a user on the autonomous driving vehicle 100b.

The robot 100a interacting with the autonomous driving vehicle 100b may control or assist the autonomous driving function of the autonomous driving vehicle 100b by obtaining sensor information on behalf of the autonomous driving vehicle 100b and providing the sensor information to the autonomous driving vehicle 100b or by obtaining sensor information, generating environment information or object information, and providing the information to the autonomous driving vehicle 100b.

Alternatively, the robot 100a interacting with the autonomous driving vehicle 100b may monitor the user on the autonomous driving vehicle 100b or control the autonomous driving vehicle 100b through the interaction with the user. For example, when it is determined that the driver is in a drowsy state, the robot 100a may activate the autonomous driving function of the autonomous driving vehicle 100b or assist the control of the driving unit of the autonomous driving vehicle 100b. The function of the autonomous driving vehicle 100b controlled by the robot 100a may include not only the autonomous driving function but also functions installed in the navigation system or audio system provided in the autonomous driving vehicle 100b.

Alternatively, the robot 100a interacting with the autonomous driving vehicle 100b may provide information to the autonomous driving vehicle 100b outside the autonomous driving vehicle 100b or assist the autonomous driving vehicle 100b outside the autonomous driving vehicle 100b. For example, the robot 100a may provide traffic information including signal information such as smart traffic lights to the autonomous driving vehicle 100b or automatically connect an electric charger to a charging port by interacting with the autonomous driving vehicle 100b like an automatic electric charger installed in an electric vehicle.

AI+Robot+XR

When the AI technology and the XR technology are applied to the robot 100a, the robot 100a may be implemented as a guide robot, a transport robot, a cleaning robot, a wearable robot, an entertainment robot, a pet robot, an unmanned flying robot, a drone, etc.

The robot 100a to which the XR technology is applied may refer to a robot subjected to control/interaction in an XR image. In this case, the robot 100a may be separated from the XR device 100c but interact with the XR device 100c.

When the robot 100a subjected to control/interaction in the XR image obtains sensor information from sensors including a camera, the robot 100a or XR device 100c may generate the XR image based on the sensor information, and then the XR device 100c may output the generated XR image. The robot 100a may operate based on a control signal input through the XR device 100c or user interaction.

For example, a user may confirm the XR image corresponding to the perspective of the robot 100a remotely controlled through an external device such as the XR device 100c. Then, the user may adjust the autonomous driving path of the robot 100a or control the operation or movement of the robot 100a through interaction therewith or check information about surrounding objects.

AI+Autonomous Driving+XR

When the AI technology and the XR technology is applied to the autonomous driving vehicle 100b, the autonomous driving vehicle 100b may be implemented as a mobile robot, a vehicle, an unmanned flying vehicle, etc.

The autonomous driving vehicle 100b to which the XR technology is applied may refer to an autonomous driving vehicle capable of providing an XR image or an autonomous driving vehicle subjected to control/interaction in an XR image. In particular, the autonomous driving vehicle 100b subjected to control/interaction in the XR image may be separated from the XR device 100c but interact with the XR device 100c.

The autonomous driving vehicle 100b capable of providing the XR image may obtain sensor information from sensors including a camera and output the generated XR image based on the obtained sensor information. For example, the autonomous driving vehicle 100b may include an HUD for outputting an XR image, thereby providing a user with an XR object corresponding to an object in the screen together with a real object.

When the XR object is displayed on the HUD, at least part of the XR object may overlap with the real object which the user look at. On the other hand, when the XR object is displayed on a display provided in the autonomous driving vehicle 100b, at least part of the XR object may overlap with the object in the screen. For example, the autonomous driving vehicle 100b may output XR objects corresponding to objects such as a lane, another vehicle, a traffic light, a traffic sign, a two-wheeled vehicle, a pedestrian, a building, etc.

When the autonomous driving vehicle 100b subjected to control/interaction in the XR image may obtain the sensor information from the sensors including the camera, the autonomous driving vehicle 100b or the XR device 100c may generate the XR image based on the sensor information, and then the XR device 100c may output the generated XR image. The autonomous driving vehicle 100b may operate based on a control signal input through an external device such as the XR device 100c or user interaction.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure may be used for a UE, a BS, a relay, or other equipment in a wireless mobile communication system.

The invention claimed is:

1. A communication method by a relay node in a wireless communication system, the method comprising:
   transmitting, to a user equipment (UE), an uplink grant including first information for changing a timing advance (TA) value;
   receiving, from the UE, a first uplink signal based on the first information; and
   receiving, from a base station (BS), a first downlink signal,
   wherein a transmission timing of the first uplink signal from the UE is determined based on the first information such that the relay node simultaneously receives the first uplink signal and the first downlink signal, and
   wherein, based on the first downlink signal including a synchronization signal block (SSB), the first uplink signal is dropped.

2. The method of claim 1, further comprising:
   transmitting, to the UE, downlink assignment information including second information for changing a propagation delay value;
   transmitting, to the UE, a second downlink signal based on the second information; and
   transmitting, to the BS, a second uplink signal,
   wherein a transmission timing of the second downlink signal is determined based on the second information such that the relay node simultaneously transmits the second uplink signal and the second downlink signal.

3. The method of claim 2, wherein based on the second downlink signal including a synchronization signal block (SSB), the second uplink signal is dropped.

4. The method of claim 1, wherein the UE includes an autonomous driving device.

5. A relay node used in a wireless communication system, the relay node comprising:
   a memory; and
   a processor configured to:
   transmit, to a user equipment (UE), an uplink grant including first information for changing a timing advance (TA) value;
   receive, from the UE, a first uplink signal based on the first information; and
   receive, from a base station (BS), a first downlink signal,
   wherein a transmission timing of the first uplink signal from the UE is determined based on the first information such that the relay node simultaneously receives the first uplink signal and the first downlink signal, and
   wherein, based on the first downlink signal including a synchronization signal block (SSB), the first uplink signal is dropped.

6. The relay node of claim 5, wherein the processor is configured to:
   transmit, to the UE, a downlink assignment including second information for changing a propagation delay value;
   transmit, to the UE, a second downlink signal based on the second information; and
   transmit to the BS, a second uplink signal,
   wherein a transmission timing of the second downlink signal is determined based on the second information such that the relay node simultaneously transmits the second uplink signal and the second downlink signal.

7. The relay node of claim 6, wherein based on the second downlink signal including a synchronization signal block (SSB), the second uplink signal is dropped.

8. The relay node of claim 5, wherein the UE includes an autonomous driving device.

* * * * *